(12) United States Patent
Palat et al.

(10) Patent No.: US 11,445,564 B2
(45) Date of Patent: Sep. 13, 2022

(54) APPARATUSES TO SWITCH BETWEEN LTE RAT AND NR RAT DURING TRANSITION FROM INACTIVE STATE TO ACTIVE STATE

(71) Applicant: Apple Inc., Cupertino, CA (US)

(72) Inventors: Sudeep Palat, Cheltenham (GB); Richard Burbidge, Shrivenham (GB); Yujian Zhang, Beijing (CN); Candy Yiu, Portland, OR (US); Marta Martinez Tarradell, Hillsboro, OR (US); Youn Hyoung Heo, Seoul (KR); Alexandre Stojanovski, Paris (FR); Sangeetha Bangolae, Houston, TX (US)

(73) Assignee: Apple Inc., Cupertino, CA (US)

( * ) Notice: Subject to any disclaimer, the term of this patent is extended or adjusted under 35 U.S.C. 154(b) by 604 days.

(21) Appl. No.: 16/462,342

(22) PCT Filed: Dec. 20, 2017

(86) PCT No.: PCT/US2017/067679
§ 371 (c)(1),
(2) Date: May 20, 2019

(87) PCT Pub. No.: WO2018/119119
PCT Pub. Date: Jun. 28, 2018

(65) Prior Publication Data
US 2019/0320483 A1    Oct. 17, 2019

Related U.S. Application Data

(60) Provisional application No. 62/436,902, filed on Dec. 20, 2016.

(51) Int. Cl.
*H04W 76/19* (2018.01)
*H04W 36/00* (2009.01)
*H04W 84/04* (2009.01)

(52) U.S. Cl.
CPC ....... *H04W 76/19* (2018.02); *H04W 36/0058* (2018.08); *H04W 84/042* (2013.01)

(58) Field of Classification Search
CPC ............. H04W 76/19; H04W 36/0058; H04W 84/042
(Continued)

(56) References Cited

U.S. PATENT DOCUMENTS

2014/0051393 A1* 2/2014 Mildh .................. H04W 48/18
455/411
2018/0041925 A1* 2/2018 Yilmaz ................. H04W 76/16
(Continued)

FOREIGN PATENT DOCUMENTS

EP        2757856 A1    7/2014

OTHER PUBLICATIONS

International Search Report and Written Opinion dated May 25, 2018 for PCT Application PCT/US2017/067679.
(Continued)

*Primary Examiner* — Chi Tang P Cheng
(74) *Attorney, Agent, or Firm* — Eschweiler & Potashnik, LLC

(57) ABSTRACT

Techniques described herein may be used to enable User Equipment (UE) to switch between Radio Access Technologies (RATs) while transitioning from an inactive state to an active state. For example, a UE may connect to a base station via one type of RAT (e.g., Long-Term Evolution (LTE) RAT), enter an inactive state, and later, while transitioning from the inactive state to an active state, connect to another base station via another type of RAT (e.g., a New Radio (NR) or 5th Generation (5G) RAT). The UE may transition from one RAT to another RAT without increasing signaling between the UE and the network beyond minimal signaling involved in a transition of the UE from the inactive state to
(Continued)

an active state. The network may further minimize signaling by determining and communicating minimized connection configuration information to the UE.

25 Claims, 9 Drawing Sheets

(58) Field of Classification Search
USPC .......................................................... 370/254
See application file for complete search history.

(56) References Cited

U.S. PATENT DOCUMENTS

| | | | |
|---|---|---|---|
| 2018/0049120 A1* | 2/2018 | Kelley | H04W 52/0212 |
| 2019/0274071 A1* | 9/2019 | Keskitalo | H04L 29/08 |
| 2020/0037285 A1* | 1/2020 | Sivavakeesar | H04W 76/27 |

OTHER PUBLICATIONS

"Benefits of Light Connection over Suspend-Resume procedure." Source: Intel Corporation. Agenda item: 21. 3GPP TSG RAN WG3 Meeting #93, Goteburg, Sweden, Aug. 22-26, 2016. R3-161582. 9 pages.

"Paging for light connection." Source: Nokia, Alcatel-Lucent Shanghai Bell. Agenda item: 21. 3GPP TSG-RAN WG3 Meeting #92, Nanjing, China, May 23-27, 2016. R3-161352. 6 pages.

* cited by examiner

APPARATUSES TO SWITCH BETWEEN LTE RAT AND NR RAT DURING TRANSITION FROM INACTIVE STATE TO ACTIVE STATE

RELATED APPLICATIONS

This application is a National Phase entry application of International Patent Application No. PCT/US2017/067679 filed Dec. 20, 2017, which claims priority to U.S. Provisional Patent Application No. 62/436,902, which was filed on Dec. 20, 2016, and is hereby incorporated by reference in its entirety.

BACKGROUND

Wireless telecommunication networks may include User Equipment (UE), Radio Access Networks (RANs), and a core network. A UE may include a wireless device (e.g., smartphone, tablet computers, laptop computers, etc.) that communicates with access nodes of the RANs (e.g., a base station, Wi-Fi access point, etc.). The UE may connect to the wireless telecommunication network by communicating with a wireless access node and registering with the core network. The connection between the UE and the wireless access node may be created by the network allocating certain wireless resources to the UE. The wireless resources may include one or more carriers (e.g., a main carrier and one or more subcarriers) corresponding to one or more radio frequency bands.

Some wireless telecommunication networks may include RAN nodes that implement different types of Radio Access Technologies (RATs). For example, some base stations of a wireless telecommunication network may implement Long-Term Evolution (LTE) technologies to communicate with UEs, while other base stations may implement a next generation technology (e.g., a Next Radio (NR) or 5th Generation (5G) technology) to communicate with UEs. Additionally, some UEs within the network may be capable of communicating with both types of base stations.

BRIEF DESCRIPTION OF THE DRAWINGS

Embodiments described herein will be readily understood by the following detailed description in conjunction with the accompanying drawings. To facilitate this description, like reference numerals may designate like structural elements, Embodiments are illustrated by way of example and not by way of limitation in the figures of the accompanying drawings.

DETAILED DESCRIPTION OF PREFERRED EMBODIMENTS

Figure 1:
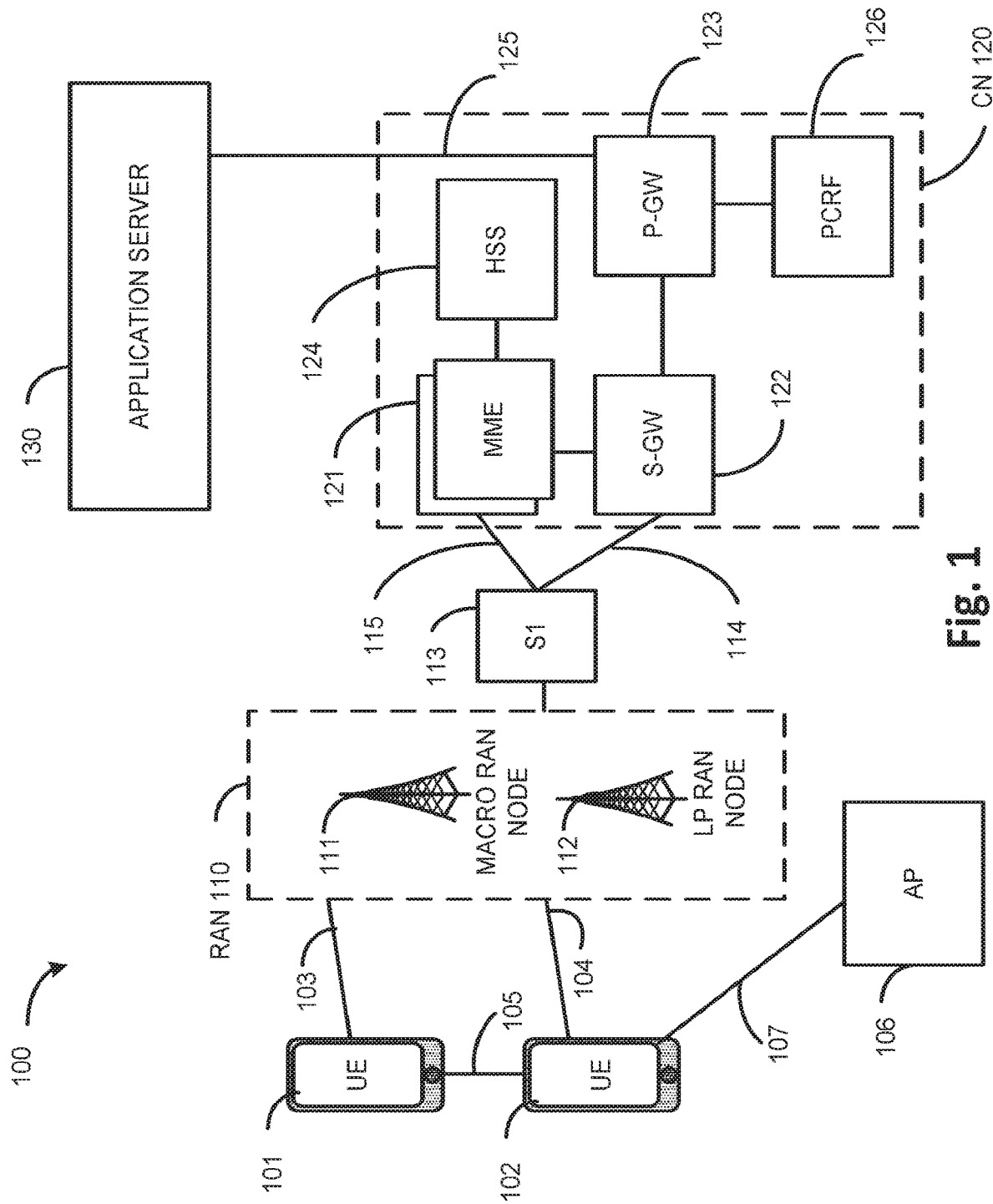
FIG. 1 illustrates an architecture of a system of a network in accordance with some embodiments.

The following detailed description refers to the accompanying drawings. The same reference numbers in different drawings may identify the same or similar elements. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Techniques described herein may be used to enable User Equipment (UE), while in an inactive state, to switch between Radio Access Network (RAN) nodes (e.g., base stations) that implement different Radio Access Technologies (RATs), such as Long-Term Evolution (LTE) and next generation technology (e.g., a Next Radio (NR) or 5th Generation (5G) technology), without creating excessive signaling within the network itself or between the UE and the RAN nodes. For example, a UE may establish a connection with a RAN node (referred to herein as the first RAN node) of a wireless telecommunication network. The first RAN node may assign an UE ID to the UE, and provide the UE with the UE ID and an indication that the network includes RAN nodes implementing different RATs (e.g., LTE and NR RATs). At sonic point (e.g., at a time of reduced UE signaling activity), the UE may transition from an active state to an inactive state.

An inactive state (or light connection state), as described herein, may include a mode of operation where the UE and the RAN do not communicate with one another but still maintain context information for a connection previously established between the UE and the network, which may enable a quick and lightweight transition by the UE from inactive to active data transmission. The inactive state may be different than other modes of operations, such as an idle state of LTE RAT, where the connection between the UE and the RAN is released. The UE may enter the inactive state in response to a message (e.g., an Inactive message) from a RAN node, and RAN context information for the connection may be stored by the UE and the network (e.g., the RAN node) while the UE is in the inactive state.

While in the inactive state, the UE may move to a location that is better served by another RAN node (referred to herein as the second RAN node), and while in the coverage area of the second RAN node, the UE may initiate a transition from the inactive state back to the active state to again communicate with the network. For example, a core network of the wireless telecommunication network may provide the first RAN node with data (e.g., user data) addressed to the UE. In response, the first RAN node may cause a paging message that is directed to the UE to be sent by multiple RAN nodes of the network (e.g. the first RAN node, a second RAN node, etc.). To explain this example, assume that while the UE was in the inactive state, the UE moved from a coverage area of the first RAN to a coverage area of a second RAN, such that the UE receives the paging message from the second RAN node. The paging message may include a prompt for the UE to transition back to the active mode. As such, the UE may send, to the second RAN node, a request (with the UE ID of the UE) to resume communicating with the network (e.g., to return to an active mode).

Upon receiving the request, the second RAN node may use the UE ID to obtain the context information stored by the first RAN node. Context information, as described herein, may include Non-Access Stratum (NAS) context information, security information, Data Radio Bearer (DRB) information, connection configuration information (e.g., Radio Resource Control (RRC) configuration information), an indication about the RAT pertaining to the connection, (e.g., LTE or NR), Quality of Service (QoS) information, etc. The second RAN node may use the context information to determine connection configuration information for the UE (e.g., radio bearer information, antenna configuration information, scheduling information, etc.).

For example, the second RAN node may determine whether the second RAN node may communicate with the UE via a connection described by RRC configuration information of the context information. Depending on this determination, the second RAN node may use the same connection configuration information or modify the connection configuration information in a manner that is suitable for communicating with the UE. Alternatively (e.g., when the second RAN node cannot support the connection configuration information from the context information), the second. RAN node may generate a completely new set of connection configuration information for the UE. An example of such a scenario may include the first RAN node implementing one type of RAT (e.g., LTE RAT) and the second RAN node implementing a different type of RAT (e.g., NR RAT), Once the second RAN node resolves the connection configuration information, the second RAN node may communicate the information to the UE.

The second RAN node and the UE may use the modified connection configuration information to resume to the connection between the UE and the network. For example, if the first RAN node received data (e.g., user data) addressed to the UE, the second RAN node may obtain the data from the first RAN node and send the data to the UE via the resumed connection. Additionally, since the previous connection (between the UE and the first RAN node) and the new connection (between the UE and the second RAN node) may be different, as per the connection configuration information modified by the second RAN node, the second RAN node may update the core network regarding the new connection.

FIG. 1 illustrates an architecture of a system 100 of a network in accordance with some embodiments. The system 100 is shown to include UE 101 and a UE 102. The UEs 101 and 102 are illustrated as smartphones (e.g., handheld touch-screen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 101 and 102 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 101 and 102 may be configured to connect, e.g., communicatively couple, with a radio access network (RAN) 110—the RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below) in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PM protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as a connection consistent with any IEEE 802.11 protocol, wherein the AP 106 would comprise a wireless fidelity (Wi-Fi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, eNBs, next Generation NodeBs (gNB), RAN nodes, and so forth, and can comprise ground stations (e.g., terrestrial access points) or satellite stations providing coverage within a geographic area (e.g., a cell). The RAN 110 may include one or more RAN nodes for providing macrocells, e.g., macro RAN node 111 (referred to individually as "RAN node 111" and collectively as "RAN nodes 111"), and one or more RAN nodes for providing femtocells or picocells (e.g., cells having smaller coverage areas, smaller user capacity, or higher bandwidth compared to macrocells), e.g., low power (LP) RAN node 112 (referred to individually as "RAN node 112" and collectively as "RAN nodes 112").

Any of the RAN nodes 111 and 112 can terminate the air interface protocol and can be the first point of contact for the UEs 101 and 102. In some embodiments, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management.

In accordance with some embodiments, the UEs 101 and 102 can be configured to communicate using Orthogonal Frequency-Division Multiplexing (OFDM) communication signals with each other or with any of the RAN nodes 111 and 112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared Channel (PDSCH) may carry user data and higher-layer signaling to the UEs 101 and 102. The physical downlink control channel (PDCCH) may carry information about the transport format and resource allocations related to the PDSCH channel, among other things. It may also inform the UEs 101 and 102 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 111 and 112 based on channel quality information fed back from any of the UEs 101 and 102. The downlink resource assignment information may be sent on the PDCCH used for (e.g., assigned to) each of the UEs 101 and 102.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LIE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 110 is shown to be communicatively coupled to a core network (CN) 120—via an S1 interface 113. In embodiments, the CN 120 may be an evolved packet core (EPC) network, a NextGen Packet Core (NPC) network, or some other type of CN. In this embodiment, the S1 interface 113 is split into two parts: the S1-U interface 114, Which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this embodiment, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (CPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110. and routes data packets between the RAN 110 and the CN 120. In addition, the S-GW 122 may be a local mobility anchor point for inter-RAN node handovers and also may provide an anchor for inter-3GPP mobility. Other responsibilities may include lawful intercept, charging, and some policy enforcement.

The P-GW 123 may terminate an SGi interface toward a PDN, The P-GW 123 may route data packets between the EPC network 123 and external networks such as a network including the application server 130 (alternatively referred to as application function (AF)) via an Internet Protocol (IP) interface 125. Generally, the application server 130 may be an element offering applications that use IP bearer resources with the core network (e.g., UNITS Packet Services (PS) domain, LTE PS data services, etc.). In this embodiment, the P-GW 123 is shown to be communicatively coupled to an application server 130 via an IP communications interface 125. The application server 130 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection, Policy and Charging Enforcement Function (PCRF) 126 is the policy and charging control element of the CN 120. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 126 may be communicatively coupled to the application server 130 via the P-GW 123. The application server 130 may signal the PCRF 126 to indicate a new service flow and select the appropriate Quality of Service (QoS) and charging parameters. The PCRF 126 may provision this rule into a Policy and Charging Enforcement Function (PCEF) (not shown) with the appropriate traffic flow template (TFT) and QoS class of identifier (QCI), which commences the QoS and charging as specified by the application server 130.

The quantity of devices and/or networks, illustrated in FIG. 1, is provided for explanatory purposes only. In practice, system 100 may include additional devices and/or networks; fewer devices and/or networks; different devices and/or networks; or differently arranged devices and/or networks than illustrated in FIG. 1. For example, while not shown, environment 100 may include devices that facilitate or enable communication between various components shown in environment 100, such as routers, modems, gateways, switches, hubs, etc. Alternatively, or additionally, one or more of the devices of system 100 may perform one or more functions described as being performed by another one or more of the devices of system 100. Additionally, the devices of system 100 may interconnect with each other and/or other devices via wired connections, wireless connections, or a combination of wired and wireless connections. In some embodiments, one or more devices of system 100 may be physically integrated in, and/or may be physically attached to, one or more other devices of system 100. Also, while "direct" connections may be shown between certain devices in FIG. 1, some of said devices may, in practice, communicate with each other via one or more additional devices and/or networks.

Figure 2:
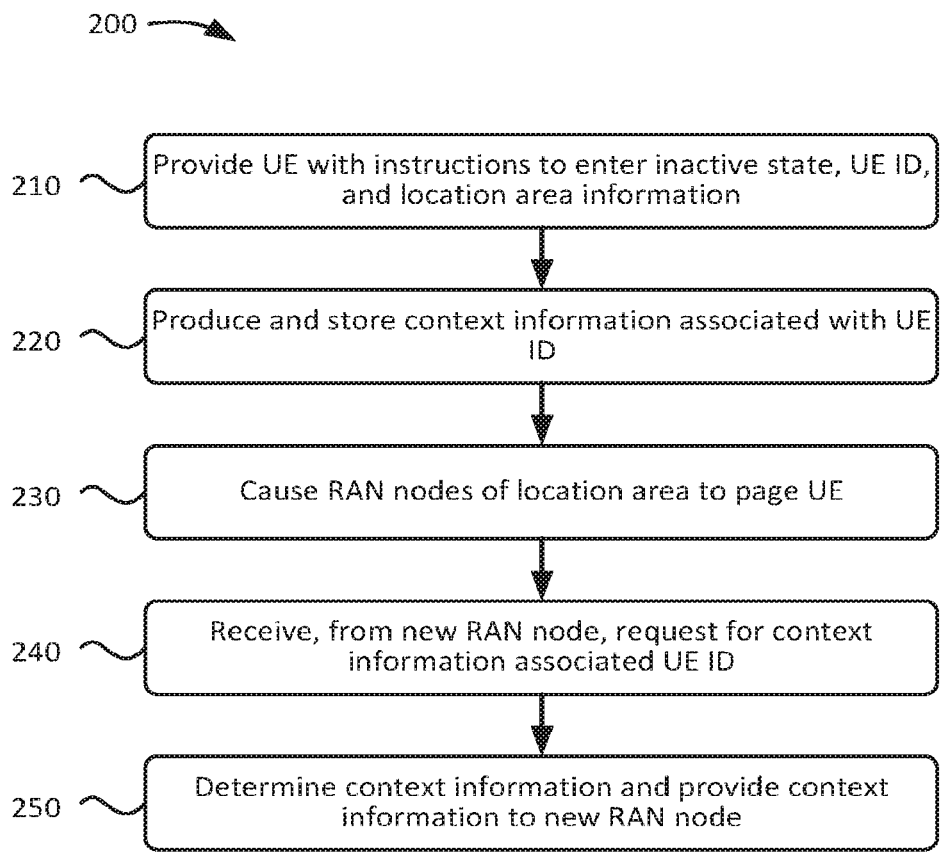
FIG. 2 is a flowchart of an example process for enabling User Equipment (UE) to switch between Radio Access Technologies (RATs) while transitioning from an inactive state to an active state.

FIG. 2 is a flowchart diagram of an example process 200 for enabling UE 101 to switch between RATs while transitioning from an inactive state to an active state. Process 200 may be performed by RAN node 111. Process 200 may correspond to one or more of the operations described below with reference to RAN node 111-1 of FIGS. 5 and 6.

As shown, process 200 may include providing UE 101 with instructions to enter an inactive state, an UE ID, and location area information (block 210). For example, UE 101 may establish a connection (e.g., enter an RRC Connected mode) with RAN node 111, which may include UE RAT or NR RAT. At some point, RAN node 111 may determine that UE 101 should enter an inactive state. Such a determination may be based on, for example, the connection between RAN 111 and UE 101 being inactive for more than a threshold amount of time, RAN node 111 detecting a level of RAN congestion or interference (e.g., signal-to-noise (SN) ratio) that exceeds a predesignated threshold, a shortage of processing or wireless resources available to RAN node 111, etc. As such, RAN node 111 may send a message to UE 101 that includes instructions for UE 101 to enter into the inactive state.

An inactive state, as described herein, may include UE 101 being in dormant mode, power save mode, and/or not engaging in wireless communications (no wireless transmissions or receptions) with the RAN. The inactive state may refer to a mode or state of operation of the 5G and/or NR protocols. While in the inactive state, UE 101 may retain context and configuration information regarding wireless resources previously assigned to UE 101 by the RAN (eNB/gNB). In some embodiments, by retaining the configuration information, UE 101 may expedite the process by which UE 101 may transition to an active state and reconnect with the network. To transition from an inactive state to an active state, UE 101 may perform a 2-Step or 4-Step RACH procedure. The inactive state may be a RRC Connected Inactive state, a light connection state, or a similar state of operation consistent with NR or 5G RATs of the 3GPP Communication Standard.

By contrast, an idle state may include a mode of operation, of UE 101, before an RRC connection is established (e.g., after UE 101 is powered on but before an RRC connection is established with an eNB). The idle state may refer to a mode or state of operation of the 4G and/or LTE protocols. Additionally, or alternatively, an idle state may include a mode of operation, of UE 101, after an RRC connection with the network is released. During the idle state, a wireless interface (e.g., antenna array) of UE 101 may be inactive, but an IP addressed assigned to UE 101, by the network, may be maintained. During the idle state, core network 120 may remain aware of UE 101 though RAN nodes may not. In some embodiments, the idle state may include an RRC_IDLE mode consistent with LTE or 4G RATs of the 3GPP Communication Standard.

In addition to the instructions for UE 101 to enter the inactive state, RAN node 111 may also provide UE 101 with an UE ID. The UE ID may be determined/selected by RAN node 111. In some embodiments, the UE ID may be determined by a device of CN 120, such as MME 121 and/or another device of CN 120. In such an embodiment, CN 120 may assign UE IDs to UEs 101 as a part of a standardized network procedure, such as UE 101 registering with CN 120, UE 101 being authenticated by CN 120, etc. In some embodiments, the UE ID may be unique UE ID across all RAN nodes of the wireless telecommunication network or all RAN nodes corresponding to the location area of UE 101 (e.g., regardless of the RAT used to establish the connection with UE 101). For example, the RAN nodes 111 of the wireless telecommunication network may coordinate with one another to ensure that, regardless of the RAT implemented by any one RAN node 111, UE IDs assigned to UEs 101 are unique. In some embodiments, this may be accomplished by intercommunications between RAN nodes 111 and/or by a centralized UE ID server and management repository.

In other embodiments, RAN nodes 111 may only coordinate with one another, with respect to UE IDs, when the RAN nodes implement the same RAT. For example, RAN nodes 111 implementing LTE RAT may coordinate with one another regarding UE ID uniqueness, and RAN nodes 111 implementing NR RAT may coordinate with one another regarding UE ID uniqueness. In such embodiments, the UE ID assigned to UE 101 may ensure uniqueness by indicating (e.g., including with, as part of, etc., the UE ID) the RAT to which the UE ID pertains.

In yet other embodiments, RAN node 111 may provide multiple UE IDs to UE 101 based on the number of RATs implemented by RAN nodes 111 of the wireless telecommunication network or of a location area (or paging area) of the wireless telecommunication network. For example, if a current location area of UE 101 includes RAN nodes 111 that implement two RATs (e.g., LTE and NR), RAN node 111 may provide UE 101 with two UE IDs, one to be used for LTE RAN nodes and another to be used for NR RAN nodes.

RAN node 111 may also, or alternatively, provide location area configuration information to UE 101. In some embodiments, a location area may be a paging area defined by a group of RAN nodes of the wireless telecommunication network. Additionally, location area configuration information, as described herein, may include information identifying, describing, etc., RAN nodes deployed within, or otherwise corresponding to, a particular area (e.g., coverage area, geographic area, etc.) of the wireless telecommunication network.

Location area configuration information may also, or alternatively, include an indication of whether and/or which RAN nodes UE 101 is permitted to communicate with, RATs that UE 101 is permitted to implemented, and signaling used to communicate throughout the RANs of the location area. In some embodiments, the location area configuration information may identify RAN nodes 111, and/or signaling configurations of RAN nodes 111, of the location area, which may better enable UE 101 to receive and recognize communications (e.g., page messages) from RAN nodes 111 of the location area.

Process 200 may also include producing and storing context information associated with UE ID (block 220). Context information, as described herein, may include information pertaining to UE 101 and the connection established between UE 101 and the network, such as NAS context information, security information, DRB information, connection configuration information (e.g., RRC connection configuration information), an indication of the RAT of the connection (e.g., LTE RAT or NR RAT), QoS information, etc. In some embodiments, context information may be RAN context information. As such, RAN node 111 may generate context information regarding UE 101 and associate the context information with the UE IDs assigned and provided to UE 101.

RAN node 111 may also cause the context information and UE ID to be stored. In some embodiments, RAN node 111 may store the information locally and/or on a storage medium under the immediate control of RAN node 111. In some embodiments, RAN node 111 may also, or alternatively, cause the context information and UE ID to be stored by another device. For instance, the information may be stored on a centralized server or group of servers, one or more RAN nodes 111 designated to manage such information, and/or anther device, such as a device described above with reference to FIG. 1. In some embodiments, instead of waiting until UE 101 enters the inactive state, RAN node 111 (and/or UE 101) may store context information at another time, such as when UE 101 initially connects to RAN node 111.

Process 200 may include causing RAN nodes 111 to page UE 101 (block 230). For example, RAN node 111 may receive, from CN 120, data that is addressed, directed to, or otherwise intended for, UE 101. In response, RAN node 111 may determine to page UE 101 while UE 101 is in the inactive state. In some embodiments, the paging procedure include RAN node 111 sending a request, to other RAN nodes 111 corresponding to the location area currently associated with UE 101, to communicate a paging message to UE 101. In some embodiments, the request may include the UE ID assigned to UE 101 to, for example, ensure that UE 101 recognizes the page message. The paging procedure initiated by RAN node 111 may include RAN node 111 transmitting a paging message to UE 101 as well.

Process 200 may include receiving, from a new RAN node 111, a request for the context information associated with UE 101 (block 240). For example, assume that UE 101 received a paging message from one of the RAN nodes 111 (referred to below as "new RAN node 111") that RAN node 111 (referred to below as "previous RAN node 111") caused to send paging messages to UE 101. In response, the UE 101 may send, to new RAN node 111, a request to resume active communications with the wireless telecommunication network (which may include UE 101 transitioning out of inactive mode and into active mode). The new RAN node 111 may respond to the request by sending a request, to previous RAN node 111, for context information associated with UE 101, which may be the UE ID assigned to UE 101 by previous RAN node 111.

Process 200 may include determining the context information and providing the context information to new RAN node 111 (block 250). For example, previous RAN 111 may use the UE ID, included in the request from new RAN 111, to query a database, or another type of data repository, for context information associated with UE 101. In some embodiments, determining the context information may also, or alternatively, include determining where (e.g., local storage device, remote server, another RAN node 111, etc.) the context information is stored and obtaining the context information from the device storing the context information.

For example, previous RAN node 111 may maintain a table, or another type of data structure, that enables previous RAN node 111 to map UE IDs to devices (e.g., a centralized server, group of servers, other RAN nodes 111, etc.) storing the context information associated with each UE ID. The information maintained by previous RAN node 111 may also indicate a type of RAT (e.g., LTE, NR, etc.) associated with each set of context information, such that previous RAN node 111 may differentiate between sets of context information associated with the same UE 101. In scenarios where multiple sets of context information are associated with one UE 101, RAN node 111 select the set of context information that corresponds to the RAT to be used (e.g., by new RAN node 111) to communicate with UE 101. Upon obtaining the context information, previous RAN node 111 may provide the context information to new RAN node 111. As described below, new RAN node 111 may use the context information to enable UE 101 to resume communications with the network.

Figure 3:
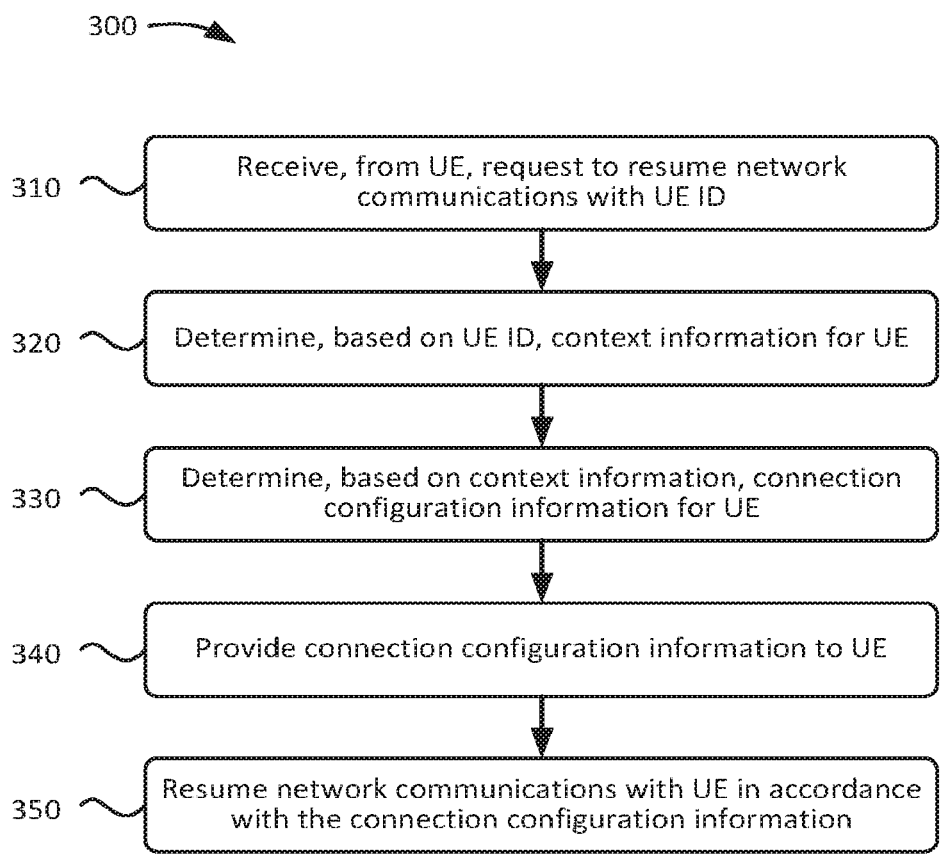
FIG. 3 is a flowchart of another example process for enabling UE to switch between RATs while transitioning from an inactive state to an active state.

FIG. 3 is a flowchart diagram of another example process 300 for enabling UE 101 to switch between RATs while transitioning from an inactive state to an active state. Process 300 may be performed by RAN node 111. Process 300 may correspond to one or more of the operations described below with reference to new RAN node 111-2 of FIGS. 5 and 6.

As shown, process 300 may include receiving, from UE 101, a request to resume communications with the network (block 310). For example, RAN node 111 may receive, from UE 101, a request (e.g., a resume request) to resume communicating with the wireless telecommunication network via RAN node 111. The request may include an UE ID previously assigned to UE 101 by another RAN node 111.

Process 300 may include determining, based on the UE ID, context information for UE 101 (block 320). For example, RAN node 111 may use the UE ID from UE 101 to query a database, or another type of data repository, for the context information associated with UE 101. In some embodiments, determining the context information may include determining where the context information is stored (e.g., a local storage device, network server, another RAN node 111, etc.) and obtaining the context information from the device storing the context information. For example, RAN node 111 may access a table, database, or another type of data structure that indicates UE IDs assigned to uES 101 and where/how the context information associated with each UE ID may be obtained. In sonic embodiments. RAN node 111 may obtain the context information from the RAN node that UE 101 to which the UE was previously connected. Additionally, in scenarios where the previous RAN node implements a Radio Access Technology (RAT) (e.g., LTE RAT, NR RAT, etc.) that the node 111 obtaining the context information, the RAN node 111 obtaining the context information may map, convert, modify, etc., the context information to a RAT implemented by the RANN node 111 obtaining the context information. For example, a NR RANN node may obtain LTE context information from an LTE RAN, and the NR RAN may convert the LTE context information to context information suitable for NR RAT.

In some embodiments, RAN node 111 may obtain the context information by providing (e.g., forwarding) the UE ID, along with a suitable request, to a default network device. As described above, context information, as described herein, may include information pertaining to UE 101 and the connection previously established between UE 101 and the network, such as NAS context information, security information, DRB information, connection configuration information (e.g., RRC connection configuration information), an indication of the RAT of the connection (e.g., LTE RAT or NR RAT), QoS information, etc.

In some embodiments, each RAN node 111 (i.e., the LTE RAN node and the NR RAN node) may be connected to a core network implementing NR or 5th Generation (5G) technology. Additionally, the LTE RAN node may provide UE 101 with the UE ID prior to the UE entering the inactive state, and the UE ID may be acceptable, recognizable, valid, etc., for both the LTE RAN and the NR node, so that the core network may support both RAN technologies. In such embodiments, the UE may provide the same UE ID to an LIE RAN node as the NR RAN node for transitioning from an inactive state to an active state and beginning again to communication with the network. In other embodiments, UE 101 may use a different UE ID to communication with each RAN technology. For instance, as mentioned above, the LTE RAN node may provide UE 101 with a UE ID prior to (or as part of) UE 101 initial entering the inactive state. However, upon receiving message from the NR RAN node, to communicate with the NR RAN node (e.g., in response to a paging message) UE 101 may map the UE ID from the LTE RAN node to a UE ID recognized by the NR RAN node (based on, e.g., a locally stored tables) and provide the mapped UE ID to the NR RAN node. In other embodiments, UE 101 may respond to the NR RAN node with the same UE ID that was assigned by the LTE RAN node, and the NR. RAN node may map the UE ID to a UE ID recognized by the NR RAN node (i.e., consistent with the NR (or 5G) RAT implemented by the NR RAN node. As such, UE 101 may UE ID received from the LTE RAN node to communicate with the NR RAN node, and may be used to determine the context information regarding the connection that UE 101 may have previously established with the LTE RAN node.

Process 300 may also include determining, based on the context information, connection configuration information for UE 101 (block 330). As described herein, connection configuration information may enable UE 101 to establish and use (and/or resume the use of) a connection between UE 101 and the network. Examples of such information may include signal radio bearer information, shared and control channel information, antenna configuration information, and scheduling information. In some embodiments, the configuration information may be RRC configuration information, which may include information included in an RRC Connection Setup message of an RRC Connection Establishment procedure.

RAN node 111 may determine whether RAN node 111 may communicate with UE 101 via a connection described by RRC configuration information of the context information already associated with the UE ID. Depending on this determination, RAN node 111 may use the same connection configuration information or modify the connection configuration information in a manner that is suitable for communicating with UE 101. Alternatively (e.g., when RAN node 111 cannot support the connection configuration information from the context information), RAN node 111 may generate a new set of connection configuration information for UE 101.

In some embodiments, RAN node 111 may determine a set of connection configuration information that RAN node 111 may support and compare the determined set of connection configuration information to the connection configuration information of the context information to determine a difference between the two sets of data. In such embodiments, when RAN node 111 later communicates connection configuration information to UE 101, RAN node 111 may only communicate the difference between the two sets of data and UE 101 may fill in the rest of the information based on the copy of the connection configuration information from the context information UE 101 previously saved in response to entering the inactive state.

Process 300 may include providing the connection configuration information to UE 101 (block 340). For example, RAN node 111 may communicate the connection configuration information to UE 101 in response to the request from UE 101 to resume communications with the network. In some embodiments, RAN node 111 may provide UE 101 with the information in a Resume Response message.

Process 300 may include resume communicating with UE 101 in accordance with the connection configuration information (block 350). For instance, RAN node 111 may establish a connection with UE 101 based on the connection configuration information and use the connection to communicate with UE 101.

Figure 4:
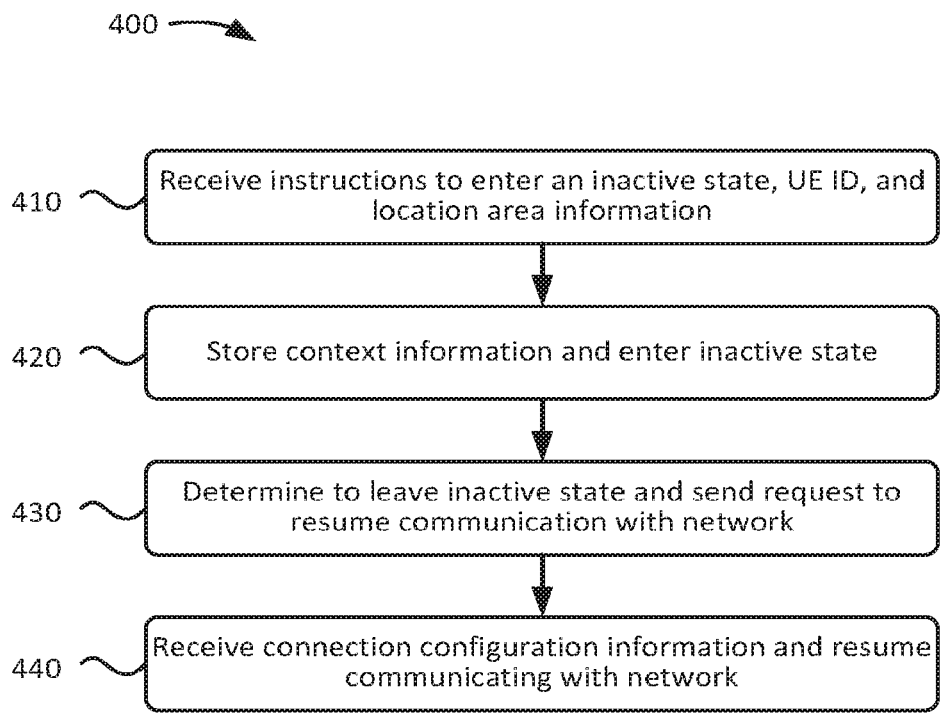
FIG. 4 is a flowchart of an example process for switching between RATs while transitioning from an inactive state to an active state.

FIG. 4 is a flowchart diagram of an example process 400 for switching between RATs while transitioning from an inactive state to an active state. Example process 400 may be performed by UE 101.

As shown, process 400 may include receiving instructions to enter an inactive state, UE ID, and location area information (block 410). For example, UE 101 may establish a connection with RAN node 111, and may use the connection to send and receive data from the network. At some point, RAN node 111 may send UE 101 a message with instructions for UE 101 to transition from an active state to an inactive state. The message may also include an UE ID assigned to UE 101, and location area information. In some embodiments, the message may only include one UE ID. In some embodiments, the message may include one UE ID associated with a RAT type (e.g., LTE, NR, etc.) supported by RAN node 111. In some embodiments, the message may include an UE ID for each type of RAT supported by RAN nodes 111 of the location area described by the location area configuration information.

In some embodiments, UE 101 may store context information for each RAT for which UE 101 has been configured to communicate with the network. For example, when UE 101 is configured to connect to a RAN node 111 via LTE RAT, UE 101 may store context information for that LTE connection. Later, when UE 101 is configured to connect to the same or a different RAN node 111 via NR RAT, UE 101 may store context information for that NR connection, such that UE 101 may store context information for both the LTE RAT and NR RAT. Similarly, each RAN node 111 may retain a copy of the context information.

As described herein, causing UE 101 and RAN nodes 111 to store multiple copies (e.g., RAT-specific copies) of context information may enable the network to reduce the amount of connection configuration information communicated from RAN nodes 111 to UEs 101. For example, when determining connection configuration information for UE 101, RAN node 111 may determine the RAT to be used to communicate with UE 101 and obtain (from another RAN node 111) context information, of the same RAT, that UE 101 may have used previously to communicate the network. The RAN node 111 may identify the connection configuration information (e.g., RRC configuration information) included in the context information, determine which parts of the connection configuration information may be reused and which parts may not, determine different connection configuration information for the parts that may not be reused, and communicate only the different connection configuration information to UE 101. Since UE 101 may still have a copy of the context information from which the reusable connection configuration information was extracted, UE 101 may create a complete set of connection configuration information by merging the locally stored copy of connection configuration information and the new (i.e., "different") connection configuration information from RAN node 111.

Additionally, each set of context information may be associated with an UE ID assigned to UE 101, and each UE ID may be mapped to the RAN node storing the context information. In embodiments where UE 101 is assigned an UE ID that is unique throughout the network, each set of context information for UE 101 may be associated with the same UE ID. By contrast, in embodiments where UE 101 is assigned UE IDs that are RAT specific (e.g., an UE ID that is unique to a particular RAT), RAT-specific, UE IDs may be associated with context information corresponding to the same type of RAT. For example, context information for a LTE connection may be associated with an UE ID designated for, or as, LTE connection scenarios, while context information for a NR connection may be associated with an UE ID designated for, or as, NR connection scenarios.

Process 400 may also include storing context information and entering the inactive state (block 420). For example, UE 101 may generate a set of context information corresponding to the connection established between UE 101 and RAN node 111. As described above, the context information may include information pertaining to UE 101 and the connection established between UE 101 and the network, such as NAS context information, security information, DRB information, connection configuration information (e.g., RRC connection configuration information), an indication of the RAT of the connection (e.g., LTE RAT or NR RAT), QoS information, etc. The context information created and stored by UE 101 may be the same as, or similar to, the context information created and stored by RAN node 111. In addition to storing the context information, UE 101 may enter the inactive state, which may include an NR mode of where UE 101 does not communicate with the network but still maintains context information for the inactive connection.

Process 400 may also include determining to leave the inactive state and sending a request to resume communication with the network (block 430). In some embodiments, UE 101 may determine to leave the inactive state based on a message or another type of prompt from the network. An example of such a prompt may include UE 101 receiving a page message from a RAN node 111 of the network. In some embodiments (e.g., if UE 101 has not moved), the prompt may be from the same RAN node 111 that cause UE 101 to enter the inactive state. In some embodiments, the prompt may be from another RAN node 111 (e.g., a RAN node corresponding to the same location area as the previous RAN node). In some embodiments, UE 101 may determine to leave the inactive state in response to something other than a prompt from the network. For example, UE 101 may determine to leave the inactive state based on a time or schedule, in response to a command or another type of prompt from a user, in response to an internal software process being executed by UE 101, etc.

Upon determining to leave the inactive state, UE 101 may generate and communicate, to the network, a message that includes a request to resume communications with the network. The message may include the UE ID(s) assigned to UE 101 (see, block 410). In some embodiments, the message may only include one UE ID. In some embodiments, the message may include one UE ID associated with a particular RAT type (e.g., LTE, NR, etc.). In some embodiments, the message may include an LIE ID for each type of RAT supported by RAN nodes 111 of the location area described by the location area configuration information. Alternatively, in scenarios where UE 101 was assigned multiple UE IDs (e.g., an UE ID for each type of RAT supported by RAN nodes 111 of the location area), the message from UE 101 may only include the UE ID that corresponds to a RAT of the current (e.g., new) RAN node 111 to which UE 101 is communicating. In such embodiments, the current RAN node 111 may determine the context information for UE 101 based on the one UE ID (regardless of whether the previous RAN node 111 and the new RAN 111 correspond to different RAT types) by, for example, mapping the UE ID provided by UE 101 to the other UE ID assigned to UE 101.

In addition, the message may include security information from the context information stored by UE 101. In such embodiments, the RAN node 111 to which the message is sent may use the security information to verify that UE 101 is authentic, which may include comparing the security information from UE 101 with a copy of the security information stored by the network when UE 101 entered the inactive mode.

Process 400 may include receiving connection configuration and resume communicating with the network (block 440). For example, in response to sending the request to resume communications with the network, UE 101 receive connection configuration information from an RAN node 111. In some embodiments, the connection configuration information may be the same as the connection configuration information previously stored as part of the context information. In some embodiments, the connection configuration information may only include a difference (in data) between the connection configuration information previously stored as part of the context information and connection configuration information that UE 101 and RAN node 111 are to use to resume communications. In some embodiments, the connection configuration information may include an entirely new set of connection configuration information than the connection configuration information previously stored as part of the context information. In some embodiments, the connection configuration information may pertain to the same type of RAT (e.g., LTE, NR, etc.)

as the connection previously established between UE 101 and the network. In some embodiments, the connection configuration information may pertain to a type of RAT (e.g., LTE, NR, etc.) that is distinct to the RAT of the previous connection.

Figure 5:
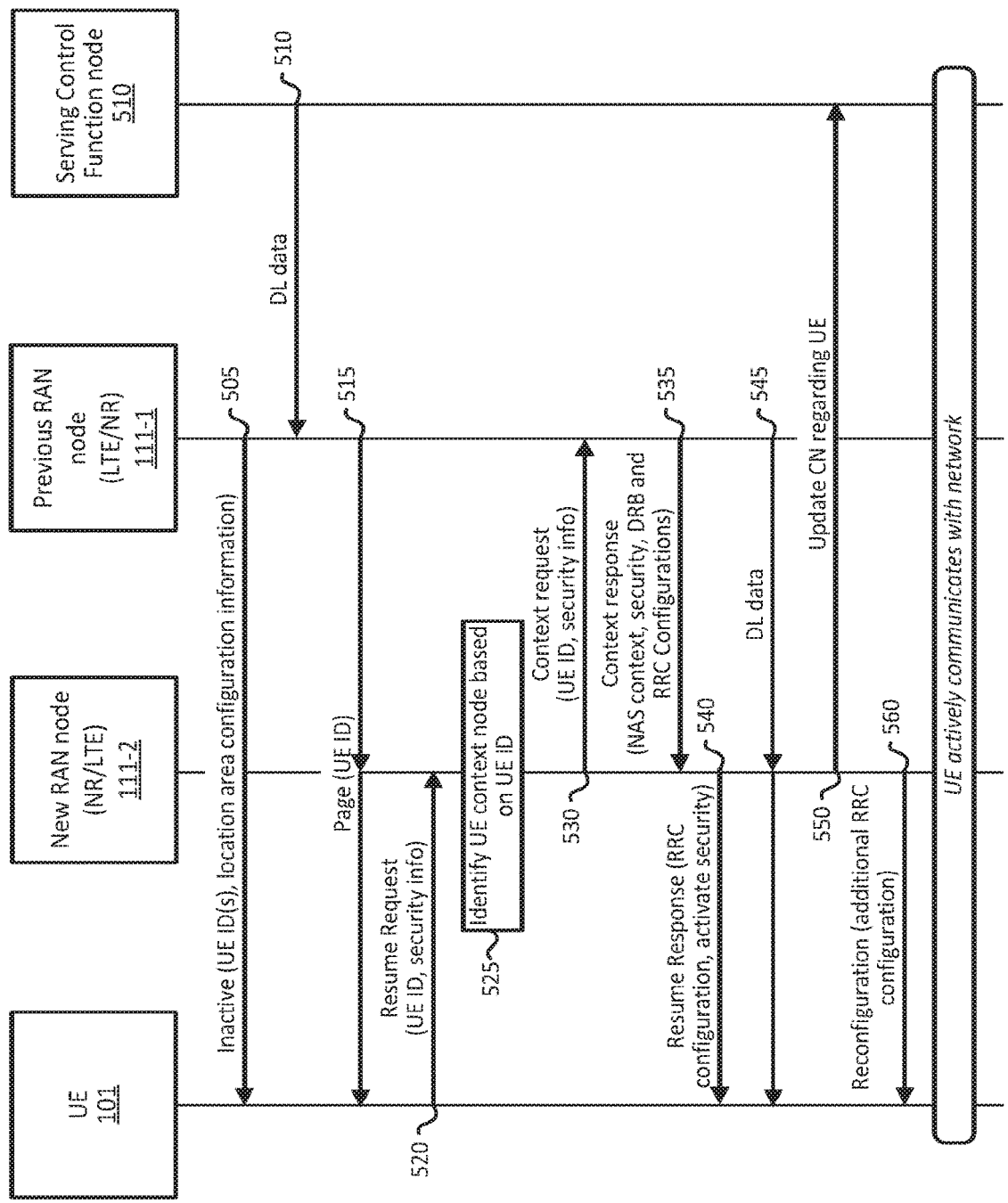
FIG. 5 is a sequence flow diagram of an example for enabling UE to switch between RATs while transitioning from an inactive state to an active state.

FIG. 5 is a sequence flow diagram of an example for enabling UE 101 to switch between RATs while transitioning from an inactive state to an active state. As shown, the example of FIG. 5 may include LIE 101, previous RAN node 111-1, new RAN node 111-2, and serving control function node 510. Examples of UE 101, RAN node 111-1, and RAN node 111-2 are discussed above with reference to FIG. 1. Serving control function node 510 may include one or more NR core network server devices capable of determining, providing, and managing control layer functions within a wireless telecommunication network. In some embodiments, serving control function node 510 may be implemented by MME 121 and/or one or more other devices of CN 120.

The example of FIG. 5 is provided as a non-limiting example. In practice, the example of FIG. 5 may include fewer, additional, alternative, operations or functions. For example, information communicated between RAN nodes may, in practice, be communicated between the RAN nodes via one or more devices/interfaces of CN 120. Additionally, one or more of the operations or functions of FIG. 5 may be performed by fewer, additional, or alternative devices, which may include one or more of the devices described above with reference to FIG. 1. For purposes of explaining FIG. 5, assume that previous RAN node 111-1 and new RAN node 111-2 support distinct types of RATs. For example, if previous RAN node 111-1 supports LTE RAT, new RAN node 111-2 may support NR RAT (and vice versa).

As shown, previous RAN node 111-1 may communicate a message an Inactive message) to UE 101 (line 505). The message may include one or more UE IDs assigned, by previous RAN node 111-1, to UE 101, and location area configuration information corresponding to a location area of previous RAN node 111-1. Scenarios in which one UE ID is assigned to UE 101 and scenarios in which multiple UE IDs are assigned to UE 101 are described above. In response to the message from previous RAN node 111-1, UE 101 may enter the inactive mode. Additionally, previous RAN node 111-1 and UE 101 may each create and store a copy of context information for the connection established between UE 101 and previous RAN node 111-1.

While UE 101 is in the inactive state, previous RAN node 111-1 may receive DL data from serving control function node 510 (line 510). The DL data may include user data addressed to UE 101. In response to the DL data, previous RAN node 111-1 may store the DL data and initiate a paging procedure directed at UE 101. For example, previous RAN node 111-1 may communicate with other RAN nodes 111 of the location area of previous RAN node 111-1 to cause the other RAN nodes 111 to transmit a page message to UE 101 (at 515). The page messages may include the UE ID assigned to UE 101.

Assume that while in the inactive state UE 101 moved to a location of the location area where a different RAN node (i.e., new RAN node 111-2) is more suited to communicate with UE 101 than previous RAN node 111-1. As such, UE 101 may receive the page message transmitted by new RAN node 111-2 (line 515). In response, UE 101 may communicate a request message (e.g., a Resume Request message) to again communicate with the network (line 520). The request message may include the UE ID assigned to UE 101. The request message may also include security information. The security information may be based on the security information stored by UE 101 and previous RAN node 111-1 as part of the context information. In some embodiments, the security information may include encryption keys and/or other types of security configuration information previously used by UE 101 and previous RAN node 111-1 to communicate with one another in a security manner, and new RAN node 111-2 may activate security for communicating with UE 101 by using the security information. As such, new RAN node 111-2 may perform a two-step configuration procedure for establishing communications with UE 101. The first step may include implementing, activating, enabling, etc., secure communication for UE 101 based on the security information; and the second step may include determining connection configuration information for establishing a connection with UE 101 and providing the connection configuration information to UE 101.

New RAN node 111-2 may identify a UE context node based on the UE ID (block 525). The UE context node may be the RAN node 111 (or other device) storing context information associated with the UE ID. For purposes of describing FIG. 5, assume that previous RAN node 111-1 is identified as the UE context node. As such, new RAN node 111-2 may send a request to previous RAN node 111-1 for context information associated with the UE ID (block 530). As shown, the request may also include the UE ID and security information received from UE 101.

In response, previous RAN node 111-1 may determine the context information associated with the UE ID. Additionally, previous RAN node 111-1 may use the security information verify that UE 101 is authentic. For example, previous RAN node 111-1 may compare the security information from new RAN node 111-2 with security information of the context information stored by previous RAN node 111-1. When the two sets of security information do not match, previous RAN node 111-1 may determine that UE 101 is not authentic and may notify new RAN nod 111-2 that UE 101 is not authentic, resulting in a termination of the process described by FIG. 5. By contrast, when the two sets of security information match, previous RAN node 111-1 may determine that UE 101 is authentic and proceed with the process of FIG. 5. For example, previous RAN node 111-1 may provide a copy of the context information to new RAN node 111-2 (line 535).

New RAN node 111-2 may respond to the context information by determining connection configuration information suitable for establishing a connection between UE 101 and new RAN node 111-2. Examples of this are described above with reference to FIG. 3. After determining suitable connection configuration information, new RAN node 111-2 may provide the information to UE 101. As shown, the connection configuration information may include RRC connection configuration information, and new RAN node 111-2 may provide the configuration information in a Resume Response message (at 540). The message from new RAN node 111-2 may also include instructions for activating security procedures for the connection described by the connection configuration information. An active connection between UE 101 and new RAN node 111-2 may result from UE 101 and new RAN node 111-2 using the connection configuration information to communicate with one another. In some embodiments, new RAN node 111-2 may implement a two-step configuration procedure with respect to UE 101. The first step of the procedure may include activating security with respect to UE 101 by providing security configuration information (e.g., security keys, etc.); and the second step may include providing UE 101 with connection configuration information after security has been activated.

Additionally, previous RAN node 111-1 may provide the DL data to new RAN node 111-2, and new RAN node 111-2 may forward the DL data to UE 101 via the newly established connection (line 545). New RAN node 111-2 may update serving control function node 510 regarding UE 101 and the connection between UE 101 and new RAN node 111-2 (line 550). Further, while UE 101 is in the active state, new RAN node 111-2 may determine that the connection is to be reconfigured (e.g., changed to another channel) (line 560), and may provide UE 101 with instructions and configuration information (e.g., RRC connection configuration information) for doing so. As such, RAN node 111-2 may change the connection between RAN node 111-2 and UE 101 after UE 101 has completed the transition from RAN node 111-1 to RAN node 111-2. In such scenarios, UE 101 may update the CN (e.g., similar to the operation of line 550) regarding the connection change.

Figure 6:
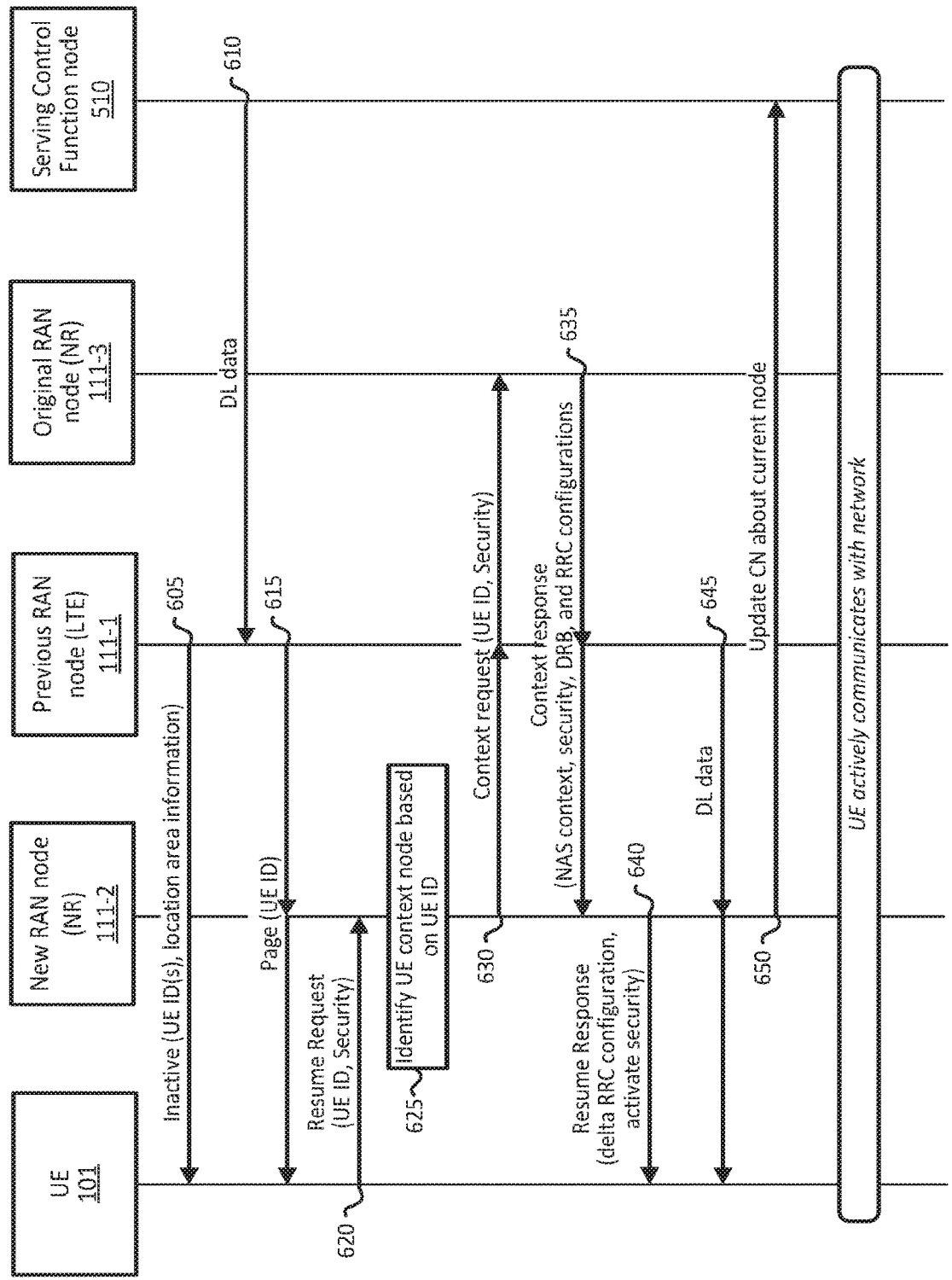
FIG. 6 is a sequence flow diagram of another example for enabling UE to switch between RATs while transitioning from an inactive state to an active state.

FIG. 6 is a sequence flow diagram of another example for enabling UE 101 to switch between RATs while transitioning from an inactive state to an active state. As shown, the example of FIG. 6 may include UE 101, previous RAN node 111-1, new RAN node 111-2, and serving control function node 510. Examples of UE 101, RAN node 111-1, RAN node 111-2, original RAN node 111-3, and serving control function node 510 are discussed above with reference to FIGS. 1 and 5. The example of FIG. 6 is provided as a non-limiting example. In practice, the example of FIG. 6 may include fewer, additional, alternative, operations or functions. Additionally, one or more of the operations or functions of FIG. 6 may be performed by fewer, additional, or alternative devices, which may include one or more of the devices described above with reference to FIG. 1.

For purposes of explaining FIG. 6, assume that UE 101, original RAN node 111-3, and previous RAN node 111-1 have performed a series of operations similar to those discussed above with reference to FIG. 5. For example, assume that UE 101 first connected to original RAN node 111-3 via NR RAT. At some point, original RAN node 111-3 caused UE 101 to enter an inactive state, which involved original RAN node 111-3 assigning UE 101 an UE ID and storing context information associated with the UE ID for UE 101. Later, original RAN node 111-3 initiated a paging procedure that resulted in a response from UE 101 to previous RAN node 111-1. While transitioning back to an active state, UE 101 was configured by, and connected to, previous RAN node 111-1 via LTE RAT, which involved previous RAN node 111-1 obtaining context information for UE 101 from original RAN node 111-3 and using the context information to provide UE 101 with suitable connection configuration information, upon which an active connection between UE 101 and previous RAN node 111-1 was established. Further, assume that each RAN node 111-1 maintains records that map (or otherwise associate) UE IDs with RAN nodes. For example, previous RAN node 111-1 may maintain a record of having obtained context information, associated with the UE ID of UE 101, from original RAN node 111-3.

As shown in FIG. 6, previous RAN node 111-1 may communicate a message (e.g., an Inactive message) to UE 101 (line 605). The message may include one or more UE IDs assigned, by previous RAN node 111-1, to UE 101, and location area configuration information corresponding to a location area of previous RAN node 111-1. Scenarios in which one UE ID is assigned to UE 101 and scenarios in which multiple UE Ins are assigned to UE 101 are described above. In response to the message from previous RAN node 111-1, UE 101 may enter the inactive state. Additionally, previous RAN node 111-1 and UE 101 may each create and store a copy of context information for the connection established between UE 101 and previous RAN node 111-1.

While UE 101 is in the inactive state, previous RAN node 111-1 may receive DL data from serving control function node 510 (line 610). The DL data may include user data addressed to UE 101. In response to the DL data, previous RAN node 111-1 may store the data and initiate a paging procedure directed at UE 101, For example, previous RAN node 111-1 may communicate with other RAN nodes 111 of the location area of previous RAN node 111-1 to cause the other RAN nodes 111 to transmit a page message to UE 101 (at 615). The page messages may include the UE ID assigned to UE 101.

Assume that while in the inactive state, UE 101 moved to a location within the location area where a different RAN node (i.e., new RAN node 111-2) is most suited to connect with UE 101. As such, UE 101 may receive the page message transmitted by new RAN node 111-2 (line 615). In response, UE 101 may communicate a request message (e.g., a Resume Request message) to again communicate with the network (line 620). The request message may include the UE ID assigned to UE 101. The request message may also include security information. The security information may be based on the security information stored by UE 101 and previous RAN node 111-1 as part of the context information. The security information provided by UE 101 may have been part of security procedure implemented by the network to ensure that communications between UE 101 and the network are secure. As such, since (for example) the previous RAN node and the new RAN node may be part of the same core network (e.g., a 5G CN) UE 101 may provide the new RAN node with security information (along with the UE ID) when attempting to recommence active communications with the network.

New RAN node 111-2 may identify a UE context node based on the UE ID (block 625). The UE context node may be the RAN node 111 (or another device) storing context information associated with the UE ID. For purposes of describing FIG. 6, assume that previous RAN node 111-1 is identified as the UE context node. In some embodiments, new RAN 111-2 may identify previous RAN node 111-1 as the UE context node based on the request from previous RAN node 111-1 for new RAN node 111-2 to participate in the paging procedure. As such, new RAN node 111-2 may send a request o previous RAN node 111-1 for context information associated with the UE ID (block 630). As shown, the request may also include the UE ID and security information received from UE 101.

In response, previous RAN node 111-1 may use the security information in the request from new RAN node 111-2 to verify that UE 101 is authentic. For example, previous RAN node 111-1 may compare the security information from new RAN node 111-2 with security information of the context information stored by previous RAN node 111-1, When the two sets of security information do not match, previous RAN node 111-1 may determine that UE 101 is not authentic and may notify new RAN nod 111-2 that UE 101 is not authentic, resulting in a termination of the process described by FIG. 6. By contrast, when the two sets of security information match, previous RAN node 111-1 may determine that UE 101 is authentic and proceed with the process of FIG. 6.

For example, previous RAN node 111-1 may map the UE ID to original RAN node 111-3 based on the records maintained by previous RAN node 111-1, and may forward the request for context information to original RAN node 111-3 (line 630). In some embodiments, prior to contacting original RAN node 111-3, previous RAN node 111-1 may determine whether previous RAN node 111-1 or original RAN node 111-3 is more likely to provide useful context information and/or configuration information. In some embodiments, previous RAN node 111-1 may do so based on the RAT types supported by new RAN node 111-2, previous RAN node 111-1, and original RAN node 111-3. For example, since new RAN node 111-2 and original RAN node 111-3 both support NR RAT (while previous RAN node 111-1 supports LTE RAT), previous RAN node 111-1 may determine that original RAN node 111-3 is likely to have context information and/or connection configuration information that is more useful to establishing a NR RAT connection between UE 101 and new RAN node 111-2. In particular, new RAN node 111-2 may be able to reuse connection configuration information previously used to establish the original connection between UE 101 and original RAN node 111-3. In some embodiments, instead of merely forwarding the request, previous RAN node 111-1 may generate and send a separate request message to original RAN node 111-3. Original RAN node 111-3 may determine context information associated with the UE ID and provide the context information to previous RAN node 111-1, and in turn, previous RAN node 111-1 may provide the context information to new RAN node 111-2 (line 635).

New RAN node 111-2 may respond to the context information by determining connection configuration information suitable for establishing a connection between UE 101 and new RAN node 111-2. In some embodiments, this may include new RAN node 111-2 using connection configuration information from original RAN node 111-3 as a baseline for determining how much of the connection configuration information can be reused by new RAN node 111-2. In such embodiments, new RAN node 111-2 may determine the changes, the difference, the delta, etc., to the connection configuration information that are to be made and provide an indication of such changes to UE 101.

As shown, the connection configuration information may include RRC connection configuration information, and new RAN node 111-2 may provide the configuration information in a Resume Response message (at 640). The message from new RAN node 111-2 may also include instructions for activating security procedures for the connection described by the connection configuration information. An active connection between UE 101 and new RAN node 111-2 may result from UE 101 and new RAN node 111-2 using the connection configuration information to communicate with one another. Additionally, previous RAN node 111-1 may provide the DL data to new RAN node 111-2, and new RAN node 111-2 may send the DL data to UE 101 via the newly established connection (line 645). New RAN node 111-2 may update serving control function node 510 regarding UE 101 and the connection between UE 101 and new RAN node 111-2 (line 650).

As used herein, the term "circuitry," "processing circuitry," or "logic" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 7:
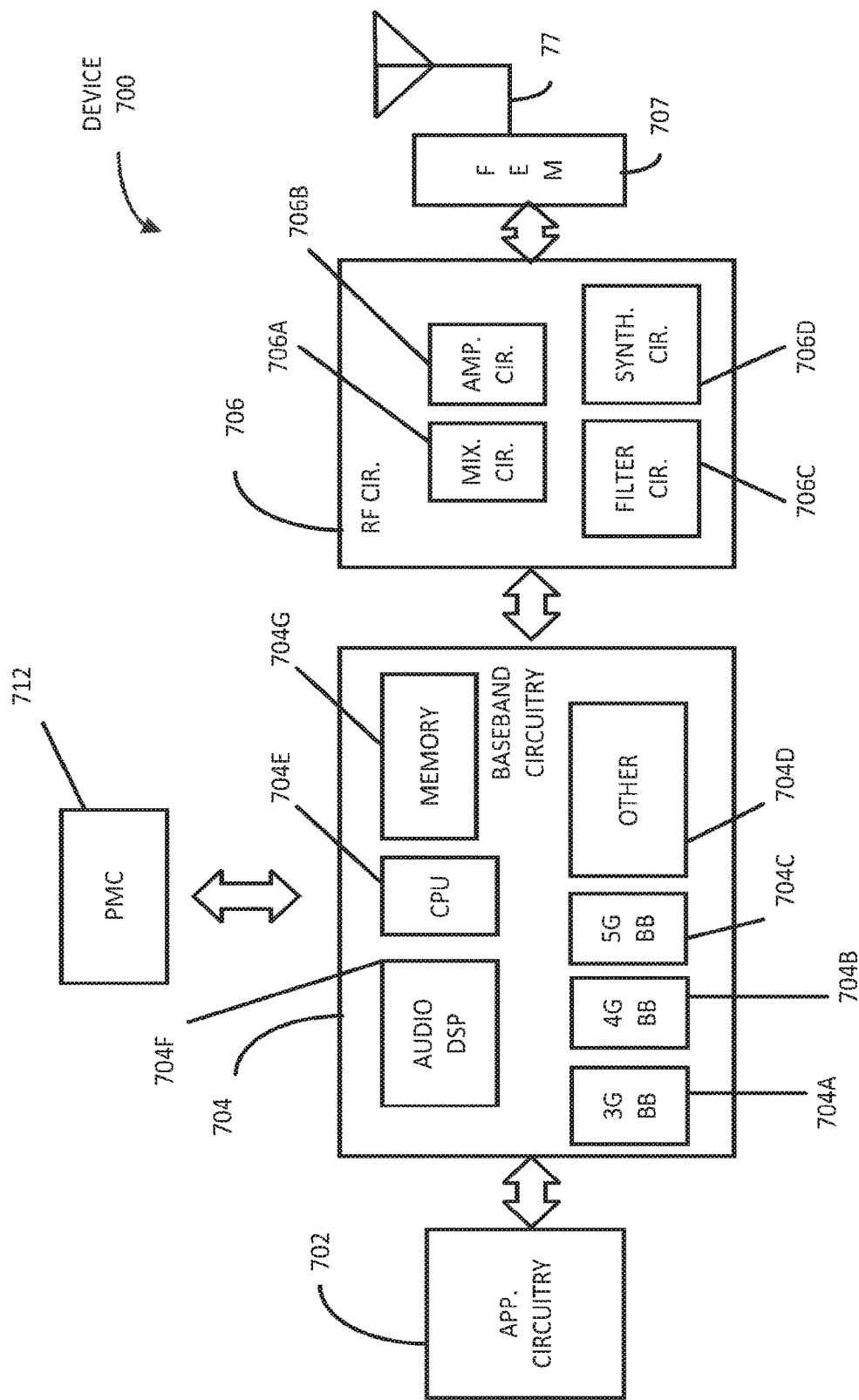
FIG. 7 illustrates example components of a device in accordance with some embodiments.

Embodiments described herein may be implemented into a system using any suitably configured hardware and/or software. FIG. 7 illustrates example components of a device 700 in accordance with some embodiments. In some embodiments, the device 700 may include application circuitry 702, baseband. circuitry 704, Radio Frequency (RF) circuitry 706, front-end module (FEM) circuitry 708, one or more antennas 710, and power management circuitry (PMC) 712 coupled together at least as shown. The components of the illustrated device 700 may be included in a UE or a RAN node. In some embodiments, the device 700 may include less elements (e.g., a RAN node may not utilize application circuitry 702, and instead include a processor/controller to process IP data received from an EPC). In some embodiments, the device 700 may include additional elements such as, for example, memory/storage, display, camera, sensor, or input/output (I/O) interface, In other embodiments, the components described below may be included in more than one device (e.g., said circuitries may be separately included in more than one device for Cloud-RAN (C-RAN) implementations).

The application circuitry 702 may include one or more application processors. For example, the application circuitry 702 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 700. In some embodiments, processors of application circuitry 702 may process IP data packets received from an EPC.

The baseband circuitry 704 may include circuitry such as, but not limited to, one or more single-core or multi-core processors. The baseband circuitry 704 may include one or more baseband processors or control logic to process baseband signals received from a receive signal path of the RF circuitry 706 and to generate baseband signals for a transmit signal path of the RF circuitry 706. Baseband processing circuity 704 may interface with the application circuitry 702 for generation and processing of the baseband signals and for controlling operations of the RF circuitry 706. For example, in some embodiments, the baseband circuitry 704 may include a third generation (3G) baseband processor 704A, a fourth generation (4G) baseband processor 704B, a fifth generation (5G) baseband processor 704C, or other baseband. processor(s) 704f) for other existing generations, generations in development or to be developed in the future (e.g., second generation (2G), sixth generation (6G), etc.). The baseband circuitry 704 (e.g., one or more of baseband processors 704A-D) may handle various radio control functions that enable communication with one or more radio networks via the RF circuitry 706. In other embodiments, some or all of the functionality of baseband processors 704A-D may be included in modules stored in the memory 704G and executed via a Central Processing Unit (CPU) 704E. The radio control functions may include, but are not limited to, signal modulation/demodulation, encoding/decoding, radio frequency shifting, etc. In some embodiments, modulation/demodulation circuitry of the baseband circuitry 704 may include Fast-Fourier Transform (FFT), preceding, or constellation mapping/demapping functionality. In some embodiments, encoding/decoding circuitry of the baseband circuitry 704 may include convolution, tail-biting convolution, turbo, Viterbi, or Low-Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 704 may include one or more audio digital signal processor(s) (DSP) 704F. The audio DSP(s) 704F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 704 and the application circuitry 702 may be implemented together such as, for example, on a system on a chip (SOC).

In some embodiments, the baseband circuitry 704 may provide for communication compatible with one or more radio technologies. For example, in some embodiments, the baseband circuitry 704 may support communication with an evolved universal terrestrial radio access network (EU-TRAN) or other wireless metropolitan area networks (WMAN), a wireless local area network (SWAN), a wireless personal area network (WPAN). Embodiments in which the baseband circuitry 704 is configured to support radio communications of more than one wireless protocol may be referred to as multi-mode baseband circuitry.

RF circuitry 706 may enable communication with wireless networks using modulated electromagnetic radiation through a non-solid medium. In various embodiments, the RF circuitry 706 may include switches, filters, amplifiers, etc. to facilitate the communication with the wireless network. RF circuitry 706 may include a receive signal path which may include circuitry to down-convert RF signals received from the FEM circuitry 708 and provide baseband signals to the baseband circuitry 704. RF circuitry 706 may also include a transmit signal path which may include circuitry to up-convert baseband signals provided by the baseband circuitry 704 and provide RF output signals to the FEM circuitry 708 for transmission.

In some embodiments, the receive signal path of the RF circuitry 706 may include mixer circuitry 706a, amplifier circuitry 706b and filter circuitry 706c. In some embodiments, the transmit signal path of the RF circuitry 706 may include filter circuitry 706c and mixer circuitry 706a. Rf circuitry 706 may also include synthesizer circuitry 706d for synthesizing a frequency for use by the mixer circuitry 706a of the receive signal path and the transmit signal path. In some embodiments, the mixer circuitry 706a of the receive signal path may be configured to down-convert RF signals received from the FEM circuitry 708 based on the synthesized frequency provided by synthesizer circuitry 706d. The amplifier circuitry 706b may be configured to amplify the down-converted signals and the filter circuitry 706c may be a low-pass filter (LPF) or band-pass filter (BPF) configured to remove unwanted signals from the clown-converted signals to generate output baseband signals. Output baseband signals may be provided to the baseband circuitry 704 for further processing. In some embodiments, the output baseband signals may be zero-frequency baseband signals, although this is not a requirement. In some embodiments, mixer circuitry 706a of the receive signal path may comprise passive mixers, although the scope of the embodiments is not limited in this respect.

In some embodiments, the mixer circuitry 706a of the transmit signal path may be configured to up-convert input baseband signals based on the synthesized frequency provided by the synthesizer circuitry 706d to generate RF output signals for the FEM circuitry 708. The baseband signals may be provided by the baseband circuitry 704 and may be filtered by filter circuitry 706c.

In some embodiments, the mixer circuitry 706a of the receive signal path and the mixer circuitry 706a of the transmit signal path may include two or more mixers and may be arranged for quadrature downconversion and upconversion, respectively. In some embodiments, the mixer circuitry 706a of the receive signal path and the mixer circuitry 706a of the transmit signal path may include two or more mixers and may be arranged for image rejection (e.g., Hartley image rejection). In some embodiments, the mixer circuitry 706a of the receive signal path and the mixer circuitry 706a may be arranged for direct downconversion and direct upconversion, respectively. In some embodiments, the mixer circuitry 706a of the receive signal path and the mixer circuitry 706a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 706 may include analog-to-digital converter (ADC) and digital-to-analog converter (DAC) circuitry and the baseband circuitry 704 may include a digital baseband interface to communicate with the RF circuitry 706.

In some dual-mode embodiments, a separate radio IC circuitry may be provided for processing signals for each spectrum, although the scope of the embodiments is not limited in this respect.

In some embodiments, the synthesizer circuitry 706d may be a fractional-N synthesizer or a fractional N/N+1 synthesizer, although the scope of the embodiments is not limited in this respect as other types of frequency synthesizers may be suitable. For example, synthesizer circuitry 706d may be a delta-sigma synthesizer, a frequency multiplier, or a synthesizer comprising a phase-locked loop with a frequency divider.

The synthesizer circuitry 706d may be configured to synthesize an output frequency for use by the mixer circuitry 706a of the RF circuitry 706 based on a frequency input and a divider control input. In some embodiments, the synthesizer circuitry 706d may be a fractional N,N+1 synthesizer.

In some embodiments, frequency input may be provided by a voltage controlled oscillator (VCO), although that is not a requirement. Divider control input may be provided by either the baseband circuitry 704 or the applications processor 702 depending on the desired output frequency. In some embodiments, a divider control input (e.g., N) may be determined from a look-up table based on a channel indicated by the applications processor 702.

Synthesizer circuitry 706d of the RF circuitry 706 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 706d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In sonic embodiments, the output frequency may be a LO frequency (fLO). In some embodiments, the RF circuitry 706 may include an IQ/polar converter.

FEM circuitry 708 may include a receive signal path which may include circuitry configured to operate on RF signals received from one or more antennas 710, amplify the received signals and provide the amplified versions of the received signals to the RF circuitry 706 for further processing. FEM circuitry 708 may also include a transmit signal path which may include circuitry configured to amplify signals for transmission provided by the RF circuitry 706 for transmission by one or more of the one or more antennas 710. In various embodiments, the amplification through the transmit or receive signal paths may be done solely in the RF circuitry 706, solely in the FEM 708, or in both the RF circuitry 706 and the FEM 708.

In some embodiments, the FEM circuitry 708 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 706). The transmit signal path of the FEM circuitry 708 may include a power amplifier (PA) to amplify input RF signals (e.g., provided by RF circuitry 706), and one or more filters to generate RF signals for subsequent transmission (e.g., by one or more of the one or more antennas 710).

In some embodiments, the PMC 712 may manage power provided to the baseband circuitry 704. In particular, the PMC 712 may control power-source selection, voltage scaling, battery charging, or DC-to-DC conversion. The PMC 712 may often be included when the device 700 is capable of being powered by a battery, for example, when the device is included in a UE. The PMC 712 may increase the power conversion efficiency while providing desirable implementation size and heat dissipation characteristics.

While FIG. 7 shows the PMC 712 coupled only with the baseband circuitry 704. However, in other embodiments, the PMC 712 may be additionally or alternatively coupled with, and perform similar power management operations for, other components such as, but not limited to, application circuitry 702, RF circuitry 706, or FEM 708.

In some embodiments, the PMC 712 may control, or otherwise be part of, various power saving mechanisms of the device 700. For example, if the device 700 is in an RRC_Connected state, where it is still connected to the RAN node as it expects to receive traffic shortly, then it may enter a state known as Discontinuous Reception Mode (DRX) after a period of inactivity. During this state, the device 700 may power down for brief intervals of time and thus save power.

If there is no data traffic activity for an extended period of time, then the device 700 may transition off to an RRC_Idle state, where it disconnects from the network and does not perform operations such as channel quality feedback, handover, etc. The device 700 goes into a very low power state and it performs paging where again it periodically wakes up to listen to the network and then powers down again. The device 700 may not receive data in this state, in order to receive data, it must transition back to RRC_Connected state.

An additional power saving mode may allow a device to be unavailable to the network for periods longer than a paging interval (ranging from seconds to a few hours) During this time, the device is totally unreachable to the network and may power down completely. Any data sent during this time incurs a large delay and it is assumed the delay is acceptable.

Processors of the application circuitry 702 and processors of the baseband circuitry 704 may be used to execute elements of one or more instances of a protocol stack. For example, processors of the baseband circuitry 704, alone or in combination, may be used execute Layer 3, Layer 2, or Layer 1 functionality, while processors of the application circuitry 704 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 8:
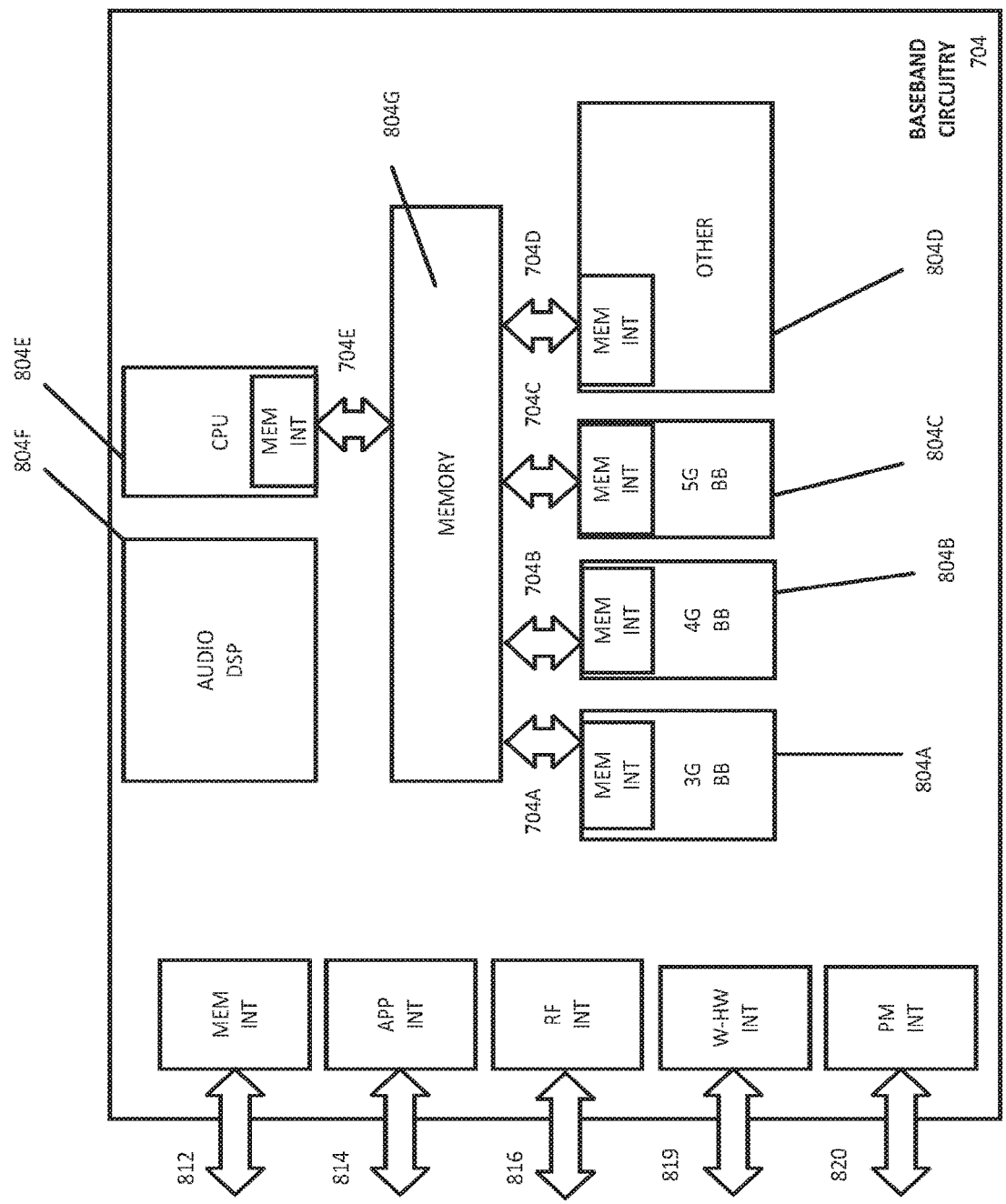
FIG. 8 illustrates example interfaces of baseband circuitry in accordance with some embodiments.

FIG. 8 illustrates example interfaces of baseband circuitry in accordance with some embodiments. As discussed above, the baseband circuitry 704 of FIG. 7 may comprise processors 804A-804E and a memory 804G utilized by said processors. Each of the processors 804A-804E may include a memory interface, respectively, to send/receive data to/from the memory 804G.

The baseband circuitry 804 may further include one or more interfaces to communicatively couple to other circuitries/devices, such as a memory interface 812 (e.g., an interface to send/receive data to/from memory external to the baseband circuitry 704), an application circuitry interface 814 (e.g., an interface to send/receive data to/from the application circuitry 702 of FIG. 7), an RF circuitry interface 816 (e.g., an interface to send/receive data to/from RF circuitry 706 of FIG. 7), a wireless hardware connectivity interface 818 (e.g., an interface to send/receive data to/from Near Field Communication (NFC) components, Bluetooth® components (e.g., Bluetooth® Low Energy), Wi-Fi® components, and other communication components), and a power management interface 820 (e.g., an interface to send/receive power or control signals to/from the PMC 712).

Figure 9:
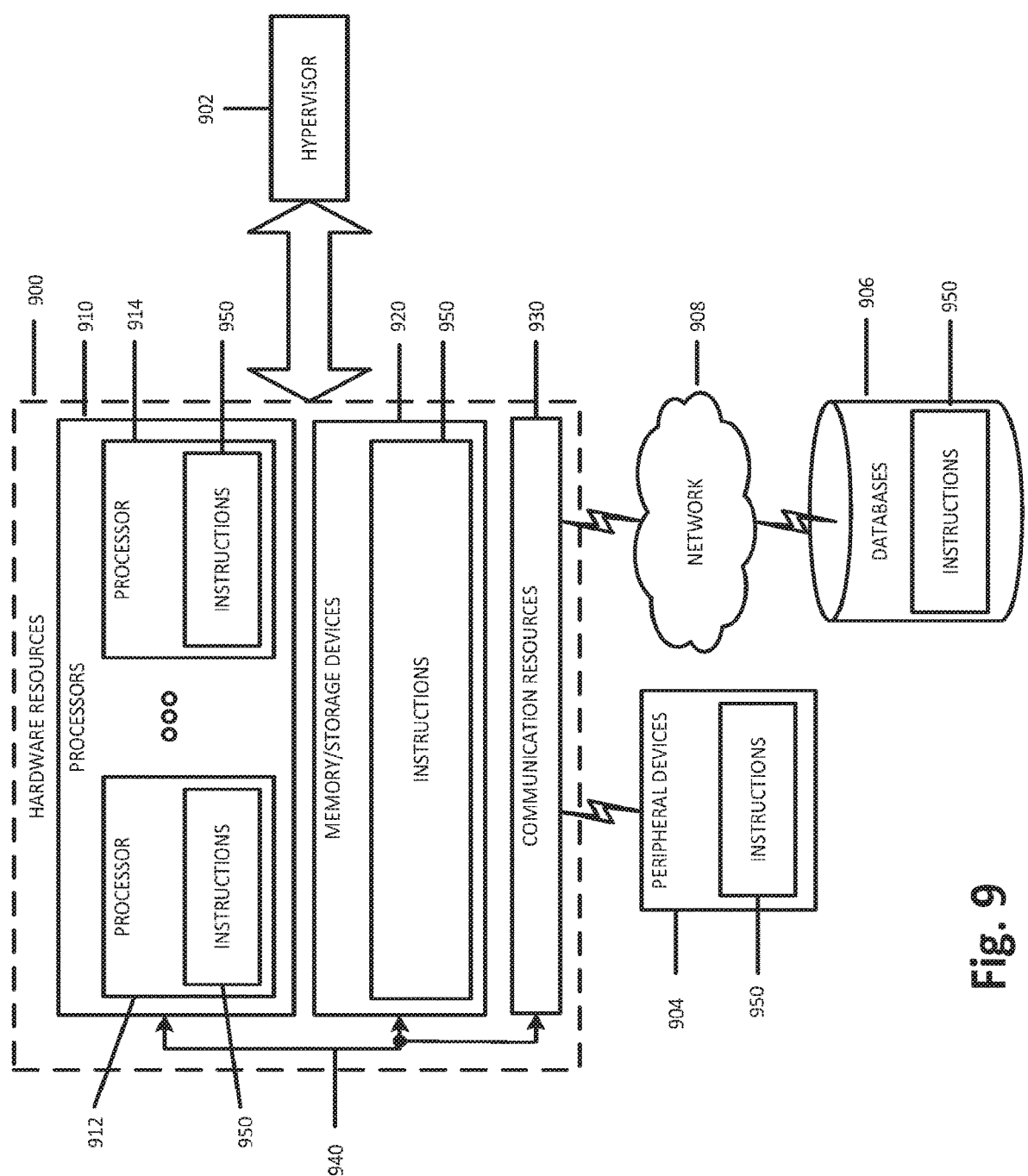
FIG. 9 is a block diagram illustrating components, according to some example embodiments, able to read instructions from a machine-readable or computer-readable medium (e.g., a non-transitory machine-readable storage medium) and perform any one or more of the methodologies discussed herein.

FIG. 9 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 9 shows a diagrammatic representation of hardware resources 900 including one or more processors (or processor cores) 910, one or more memory/storage devices 920, and one or more communication resources 930, each of which may be communicatively coupled via a bus 940. For embodiments where node virtualization (e.g., NFV) is utilized, a hypervisor 902 may be executed to provide an execution environment for one or more network slices/sub-slices to utilize the hardware resources 900

The processors 910 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 912 and a processor 914.

The memory/storage devices 920 may include main memory, disk storage, or any suitable combination thereof. The memory/storage devices 920 may include, but are not limited to any type of volatile or non-volatile memory such as dynamic random-access memory (DRAM), static random-access memory (SRAM), erasable programmable read-only memory (EPROM), electrically erasable programmable read-only memory (EEPROM), Flash memory, solid-state storage, etc.

The communication resources 930 may include interconnection or network interface components or other suitable devices to communicate with one or more peripheral devices 904 or one or more databases 906 via a network 908. For example, the communication resources 930 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 950 may comprise software, a program, an application, an applet, an app, or other executable code for causing at least any of the processors 910 to perform any one or more of the methodologies discussed herein. The instructions 950 may reside, completely or partially, within at least one of the processors 910 (e.g., within the processor's cache memory), the memory/storage devices 920, or any suitable combination thereof. Furthermore, any portion of the instructions 950 may be transferred to the hardware resources 900 from any combination of the peripheral devices 904 or the databases 906. Accordingly, the memory of processors 910, the memory/storage devices 920, the peripheral devices 904, and the databases 906 are examples of computer-readable and machine-readable media.

A number of examples, relating to embodiments of the techniques described above, will next be given.

A first example may include an apparatus of a Radio Access Network (RAN) node, the apparatus comprising: an interface to radio frequency (RF) circuitry; and one or more processors to: process, via the interface to the RF circuitry, a request for a User Equipment (UE) to transition from an inactive state to an active state, the request including an UE identity (ID) assigned to the UE by another RAN node, the RAN node corresponding to a first Radio Access Technology (RAT) and the another RAN node corresponding to a second RAT that is different than the first RAT; determine, based on the UE ID, context information regarding a connection previously established between the UE and the another RAN node; determine, based on the context information from the LTE RAN node, connection configuration information for establishing a connection between the NR RAN node and the UE; and cause, via the interface RF circuity, the connection configuration information to be communicated to the UE to enable the UE to transition to an active state and communicate with the NR RAN node using the connection configuration information.

In example 2, the subject matter of example 1, or any of the examples herein, wherein the first RAT includes New Radio (NR) RAT and the second RAT includes Long-Term Evolution (LTE) RAT.

In example 3, the subject matter of example 1, or any of the examples herein, wherein the first RAT includes Long-Term Evolution (LTE) RAT and the second RAT includes New Radio (NR) RAT.

In example 4, the subject matter of example 1, or any of the examples herein, Wherein the UE ID is used to identify the UE in the first RAT and the second RAT.

In example 5, the subject matter of example 1, or any of the examples herein, wherein the RAN node and the another RAN node are connected to a 5th Generation (5G) core network, and the UE ID is associated with the context information for the UE.

In example 6, the subject matter of example 1, or any of the examples herein, wherein, prior to the UE entering the inactive state, the UE is provided paging area information that includes a first identifier corresponding to the RAN node and a second identifier corresponding to the another RAN node, that the UE may use to roam without incurring any additional signaling.

In example 7, the subject matter of example 1, or any of the examples herein, wherein, to determine the context information, the one or more processors are to: obtain the context information from the another RAN node by communicating a request for the context information, which includes the UE ID, to the another RAN node; and map second RAT context information to the first RAT.

In example 8, the subject matter of example 1, or any of the examples herein, wherein, to determine the connection configuration information, the one or more processors are to: determine whether to establish a connection with the that is a duplicate of the connection previously established between the UE and the another RAN node.

In example 9, the subject matter of example 1, or any of the examples herein, wherein the request for the UE to transition from the inactive state to the active state includes security information that corresponds to the connection previously established between the UE and the another RAN.

In example 10, the subject matter of example 1, or any of the examples herein, wherein the one or more processors are to: perform a two-step configuration procedure for communicating with UE, the two-step configuration procedure including: a first step of activating security for communicating with the UE, and a second step of causing the connection configuration information to be communicated to the UE.

In example 11, the subject matter of example 1, or any of the examples herein, wherein the one or more processors are further to: receive, from the anther RAN, a request to page the UE, the request to page the UE including a copy of the UE ID; and cause a paging message, with the copy of the UE ID, to be transmitted to the UE in response to the request to page the UE.

In example 12, an apparatus of a Radio Access Network (RAN) node may comprise: an interface to radio frequency (RF) circuitry; and one or more processors to: process information directed to a User Equipment (UE) that was previously connected to the RAN node during an active state but that has since transitioned to an inactive state; cause, in response to the information directed to the UE, another RAN node to prompt the UE to transition from the inactive state to the active state, the RAN node corresponding to a first Radio Access Technology (RAT) and the another RAN node corresponding to a second RAT that is different than the first RAT; receive, via the interface to the RF circuitry and from the another RAN, a request for context information regarding a connection previously established between the RAN node and the UE, the request including a UE identity (ID) previously assigned to the UE by the RAN node; obtain, based on the UE ID, the context information; and provide the context information to the another RAN node.

In example 13, the subject matter of example 12, or any of the examples herein, wherein the first RAT includes Next Radio (NR) RAT and the first RAT includes Long-Term Evolution (LTE) RAT.

In example 14, the subject matter of example 12, or any of the examples herein, wherein the first RAT includes Long-Term Evolution (LTE) RAT and the first RAT includes Next Radio (NR) RAT.

In example 15, the subject matter of example 12, or any of the examples herein, wherein the UE ID is used to identify the UE in the first RAT and the second RAT.

In example 16, the subject matter of example 12, or any of the examples herein, wherein: the UE ID is used to identify the UE in the second RAT, and to determine the context information, the one or more processors are to: map the UE ID to another UE ID that corresponds to the first RAT and determine the context information based on the another UE ID.

In example 17, the subject matter of example 12, or any of the examples herein, wherein the RAN node and the another RAN node page the UE to cause the UE to transition from the inactive state to the active state.

In example 18, the subject matter of example 12, or any of the examples herein, wherein the context information is obtained from a different RAN node to which the UE was connected before the UE was connected to the RAN node.

In example 19, the subject matter of example 12, or any of the examples herein, wherein the inactive state includes a mode of operation where the UE does not use a previously established wireless connection but still maintains configuration information for the previously established wireless connection.

In example, 20, an apparatus of a User Equipment (UE), the apparatus comprising: an interface to radio frequency (RF) circuitry; and one or more processors to: establish, via the interface to the RF circuitry, a wireless connection with a Radio Access Network (RAN) node corresponding to a first Radio Access Technology (RAT); receive, via the interface to the RF circuitry, a UE ID assigned to the UE by the RAN node; transition from an active state to an inactive state; receive, via the interface to the RF circuitry and from another RAN node, a prompt to transition from the inactive state to the active state, the another RAN corresponding to a second RAT that is different than the first RAT; communicate, via the interface to the RF circuitry and to the another RAN node, a request to establish a connection with the another RAN node, the request including the UE ID; receive, via the interface to the RF circuitry and from the another RAN node, configuration information for establishing the connection with the another RAN node; establish the connection based on the configuration information; and communicate, via the interface to the RF circuitry, with the another RAN.

In example 21, the subject matter of example 20, or any of the examples herein, wherein the first RAT includes Next Radio (NR) RAT and the first RAT includes Long-Term Evolution (LTE) RAT.

In example 22, the subject matter of example 20, or any of the examples herein, wherein the first RAT includes Long-Term Evolution (LTE) RAT and the first RAT includes Next Radio (NR) RAT.

In example 23, the subject matter of example 20, or any of the examples herein, wherein the UE ID is used to identify the UE in the first RAT and the second RAT.

In example 24, the subject matter of example 20, or any of the examples herein, wherein the UE ID is only used to identify the UE in the first RAT.

In example 25, the subject matter of example 20, or any of the examples herein, wherein, prior to entering the inactive mode, the one or more processors are further to: receive paging area information that includes a first identifier corresponding to the RAN node and a second identifier corresponding to the another RAN node, that the UE may use to roam without incurring any additional signaling.

In example 26, the subject matter of example 20, or any of the examples herein, wherein the inactive state includes a mode of operation where the UE does not use the wireless connection established with the RAN node but still maintains configuration information for the previously established wireless connection.

In example 27, the subject matter of example 20, or any of the examples herein, wherein the configuration information from the another RAN node describes the wireless connection established with the RAN node.

In example 28, the subject matter of example 20, or any of the examples herein, wherein the configuration information from the another RAN node describes a different connection than the wireless connection established with the RAN node.

In example 29, the subject matter of example 20, or any of the examples herein, wherein the prompt includes a paging message with the UE ID.

In example 30, a computer-readable medium containing program instructions for causing one or more processors, associated with a Radio Access Network (RAN) node, to: process, via the interface to the RF circuitry, a request for a User Equipment (UE) to transition from an inactive state to an active state, the request including an UE identity (ID) assigned to the UE by another RAN node, the RAN node corresponding to a first Radio Access Technology (RAT) and the another RAN node corresponding to a second RAT that is different than the first RAT; determine, based on the UE ID, context information regarding a connection previously established between the UE and the another RAN node; determine, based on the context information from the LTE RAN node, connection configuration information for establishing a connection between the NR RAN node and the UE; and cause, via the interface RF circuity, the connection configuration information to be communicated to the UE to enable the UE to transition to an active state and communicate with the NR RAN node using the connection configuration information.

In example 31, the subject matter of example 1, or any of the examples herein, wherein the first RAT includes New Radio (NR) RAT and the second RAT includes Long-Term Evolution (LTE) RAT.

In example 32, the subject matter of example 1, or any of the examples herein, wherein the first RAT includes Long-Term Evolution (LTE) RAT and the second RAT includes New Radio (NR) RAT.

In example 33, the subject matter of example or any of the examples herein, wherein the UE ID is used to identify the UE in the first RAT and the second RAT.

In example 34, the subject matter of example 1, or any of the examples herein, wherein the RAN node and the another RAN node are connected to a 5th Generation (5G) core network, and the UE ID is associated with the context information for the UE.

In example 35, the subject matter of example 1, or any of the examples herein, wherein, prior to the UE entering the inactive state, the UE is provided paging area information that includes a first identifier corresponding to the RAN node and a second identifier corresponding to the another RAN node, that the UE may use to roam without incurring any additional signaling.

In example 36, the subject matter of example 1, or any of the examples herein, wherein, to determine the context information, the one or more processors are to: obtain the context information from the another RAN node by communicating a request for the context information, which includes the UE ID, to the another RAN node; and map second RAT context information to the first RAT.

In example 37, the subject matter of example 1, or any of the examples herein, wherein, to determine the connection configuration information, the one or more processors are to: determine whether to establish a connection with the that is a duplicate of the connection previously established between the UE and the another RAN node.

In example 38, the subject matter of example 1, or any of the examples herein, wherein the request for the UE to transition from the inactive state to the active state includes security information that corresponds to the connection previously established between the UE and the another RAN.

In example 39, the subject matter of example 1, or any of the examples herein, wherein the one or more processors are to: perform a two-step configuration procedure for communicating with UE, the two-step configuration procedure including: a first step of activating security for communicating with the UE, and a second step of causing the connection configuration information to be communicated to the UE.

In example 40, the subject matter of example 1, or any of the examples herein, wherein the one or more processors are further to: receive, from the anther RAN, a request to page the UE, the request to page the UE including a copy of the UE ID; and cause a paging message, with the copy of the UE ID, to be transmitted to the UE in response to the request to page the UE.

In example 41, an apparatus of a Radio Network (RAN) node, the apparatus comprising: means for processing a request for a User Equipment (UE) to transition from an inactive state to an active state, the request including an UE identity (ID) assigned to the UE by another RAN node, the RAN node corresponding to a first Radio Access Technology (RAT) and the another RAN node corresponding to a second RAT that is different than the first RAT; means for determining, based on the UE ID, context information regarding a connection previously established between the UE and the another RAN node; means for determining, based on the context information from the UE RAN node, connection configuration information for establishing a connection between the NR RAN node and the UE; and means for causing, via the interface RF circuitry, the connection configuration information to be communicated to the UE to enable the UE to transition to an active state and communicate with the NR RAN node using the connection configuration information.

In example 42, the subject matter of example 41, or any of the examples herein, wherein the first RAT includes New Radio (NR) RAT and the second RAT includes Long-Term Evolution (LTE) RAT.

In example 43, the subject matter of example 41, or any of the examples herein, wherein the first RAT includes Long-Term Evolution (LTE) RAT and the second RAT includes New Radio (NR) RAT.

In example 44, the subject matter of example 41, or any of the examples herein, wherein the UE ID is used to identify the UE in the first RAT and the second RAT.

In example 45, the subject matter of example 41, or any of the examples herein, wherein the RAN node and the another RAN node are connected to a 5th Generation (5G) core network, and the UE ID is associated with the context information for the UE.

In example 46, the subject matter of example 41, or any of the examples herein, wherein, prior to the UE entering the inactive state, the UE is provided paging area information that includes a first identifier corresponding to the RAN node and a second identifier corresponding to the another RAN node, that the UE may use to roam without incurring any additional signaling.

In example 47, the subject matter of example 41, or any of the examples herein, further comprising: means for, to determine the context information, obtaining the context information from the another RAN node by communicating a request for the context information, which includes the UE ID, to the another RAN node; and means for mapping the second RAT context information to the first RAT.

In example 48, the subject matter of example 41, or any of the examples herein, further comprising: means for, to determine the connection configuration information, determining whether to establish a connection with the that is a duplicate of the connection previously established between the UE and the another RAN node.

In example 49, the subject matter of example 41, or any of the examples herein, wherein the request for the UE to transition from the inactive state to the active state includes security information that corresponds to the connection previously established between the UE and the another RAN.

In example 50, the subject matter of example 41, or any of the examples herein, further comprising: means for performing a two-step configuration procedure for communicating with UE, the two-step configuration procedure including: a first step of activating security for communicating with the UE, and a second step of causing the connection configuration information to be communicated to the UE.

In example 51, the subject matter of example 41, or any of the examples herein, wherein further comprising means for receiving, from the anther RAN, a request to page the UE, the request to page the UE including a copy of the UE ID; and means for causing a paging message, with the copy of the UE ID, to be transmitted to the UE in response to the request to page the UE.

In example 52, a method, performed by a Radio Access Network (RAN) node, the method comprising: processing a request for a User Equipment (UE) to transition from an inactive state to an active state, the request including an UE identity (ID) assigned to the UE by another RAN node, the RAN node corresponding to a first Radio Access Technology (RAT) and the another RAN node corresponding to a second RAT that is different than the first RAT; determining, based on the UE ID, context information regarding a connection previously established between the UE and the another RAN node; determining, based on the context information from the LTE RAN node, connection configuration information for establishing a connection between the NR RAN node and the UE; and causing, via the interface RF circuity, the connection configuration information to be communicated to the UE to enable the UE to transition to an active state and communicate with the NR RAN node using the connection configuration information.

In example 53, the subject matter of example 41, or any of the examples herein, wherein the first RAT includes New Radio (NR) RAT and the second RAT includes Long-Term Evolution (LTE) RAT.

In example 54, the subject matter of example 41, or any of the examples herein, wherein the first RAT includes Long-Term Evolution (LTE) RAT and the second RAT includes New Radio (NR) RAT.

In example 55, the subject matter of example 41, or any of the examples herein, wherein the UE ID is used to identify the UE in the first RAT and the second RAT.

In example 56, the subject matter of example 41, or any of the examples herein, wherein the RAN node and the another RAN node are connected to a 5th Generation (5G) core network, and the UE ID is associated with the context information for the UE.

In example 57, the subject matter of example 41, or any of the examples herein, wherein, prior to the UE entering the inactive state, the UE is provided paging area information that includes a first identifier corresponding to the RAN node and a second identifier corresponding to the another RAN node, that the UE may use to roam without incurring any additional signaling.

In example 58, the subject matter of example 41, or any of the examples herein, further comprising: to determine the context information, obtaining the context information from the another RAN node by communicating a request for the context information, which includes the UE ID, to the another RAN node; and mapping second RAT context information to the first RAT.

In example 59, the subject matter of example 41, or any of the examples herein, further comprising: to determine the connection configuration information, determining whether to establish a connection with the that is a duplicate of the connection previously established between the UE and the another RAN node.

In example 60, the subject matter of example 41, or any of the examples herein, wherein the request for the UE to transition from the inactive state to the active state includes security information that corresponds to the connection previously established between the UE and the another RAN.

In example 61, the subject matter of example 41, or any of the examples herein, further comprising: performing a two-step configuration procedure for communicating with UE, the two-step configuration procedure including: a first step of activating security for communicating with the UE, and a second step of causing the connection configuration information to be communicated to the UE.

In example 61, the subject matter of example 41, or any of the examples herein, further comprising receiving, from the anther RAN, a request to page the UE, the request to page the UE including a copy of the UE ID; and causing a paging message, with the copy of the UE ID, to be transmitted to the UE in response to the request to page the UE.

In the preceding specification, various embodiments have been described with reference to the accompanying drawings. It will, however, be evident that various modifications and changes may be made thereto, and additional embodiments may be implemented, without departing from the broader scope as set forth in the claims that follow. The specification and drawings are accordingly to be regarded in an illustrative rather than restrictive sense.

For example, while series of signals and/or operations have been described with regard to FIGS. 2-6 the order of the signals/operations, quantity of signals/operations, and/or types of signals/operations may be modified in other implementations. Further, non-dependent signals may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to be limiting. In fact, many of these features may be combined in ways not specifically recited in the claims and/or disclosed in the specification.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used.

What is claimed is:

1. An apparatus of a Radio Access Network (RAN) node, the apparatus comprising:
   an interface to radio frequency (RF) circuitry; and
   one or more processors to:
      process, via the interface to the RF circuitry, a request for a User Equipment (UE) to transition from an inactive state to an active state, the request including a UE identity (ID) assigned to the UE by another RAN node, the RAN node corresponding to a first Radio Access Technology (RAT) and the another RAN node corresponding to a second RAT that is different than the first RAT;
      determine, based on the UE ID, context information including previous connection configuration information, the context information regarding a connection previously established between the UE and the another RAN node;
      determine, based on the context information from the another RAN node, connection configuration information for establishing a connection between the RAN node and the UE; and
      cause, via the interface to the RF circuity, the connection configuration information to be communicated to the UE, the communication including a difference in data between the determined connection configuration information and the previous connection configuration information, the communication to enable the UE to transition to the active state and communicate with the RAN node using the connection configuration information.

2. The apparatus of claim 1, wherein the first RAT includes New Radio (NR) RAT and the second RAT includes Long-Term Evolution (LTE) RAT.

3. The apparatus of claim 1, wherein the first RAT includes Long-Term Evolution (LTE) RAT and the second RAT includes New Radio (NR) RAT.

4. The apparatus of claim 1, wherein the RAN node and the another RAN node are connected to a $5^{th}$ Generation (5G) core network, and the UE ID is associated with the context information for the UE.

5. The apparatus of claim 1, wherein, prior to the UE entering the inactive state, the UE is provided paging area information that includes a first identifier corresponding to the RAN node and a second identifier corresponding to the another RAN node, that the UE may use to roam without incurring any additional signaling.

6. The apparatus of claim 1, wherein, to determine the context information, the one or more processors are to:
obtain second RAT context information from the another RAN node by communicating a request for context information, which includes the UE ID, to the another RAN node; and
map second RAT context information to the first RAT.

7. The apparatus of claim 1, wherein, to determine the connection configuration information, the one or more processors are to:
determine whether to establish a connection with the RAN node that is a duplicate of the connection previously established between the UE and the another RAN node.

8. The apparatus of claim 1, wherein the request for the UE to transition from the inactive state to the active state includes security information that corresponds to the connection previously established between the UE and the another RAN node; and
wherein the one or more processors are further configured to:
cause, via the interface to the RF circuitry, security information to be communicated to the another RAN node; and
receive, via the interface to the RF circuitry, a determined authenticity of the UE from the another RAN node, the RAN node choosing to communicate or terminate a connection with the UE based on the determined authenticity.

9. The apparatus of claim 1, wherein the one or more processors are to:
perform a two-step configuration procedure for communicating with the UE, the two-step configuration procedure including:
a first step of activating security for communicating with the UE, and
a second step of causing the connection configuration information to be communicated to the UE.

10. The apparatus of claim 1, wherein the one or more processors are further to:
receive, from the another RAN node, a request to page the UE, the request to page the UE including a copy of the UE ID; and
cause a paging message, with the copy of the UE ID, to be transmitted to the UE in response to the request to page the UE.

11. The apparatus of claim 1, wherein the apparatus stores information indicating a RAT associated with the context information.

12. An apparatus of a Radio Access Network (RAN) node, the apparatus comprising:
an interface to radio frequency (RF) circuitry; and
one or more processors to:
process information directed to a User Equipment (UE) that was previously connected to the RAN node during an active state but that has since transitioned to an inactive state;
cause, in response to the information directed to the UE, another RAN node to prompt the UE to transition from the inactive state to the active state, the RAN node corresponding to a first Radio Access Technology (RAT) and the another RAN node corresponding to a second RAT that is different than the first RAT;
receive, from the another RAN node, a request for context information regarding a connection previously established between the RAN node and the UE, the request including security information and a UE identity (ID) previously assigned to the UE by the RAN node;
compare the received security information with other security information previously stored by the RAN node;
determine an authenticity of the UE; and
provide the context information based on the UE ID to the another RAN node, the context information comprising the determined authenticity of the UE.

13. The apparatus of claim 12, wherein the first RAT includes New Radio (NR) RAT and the second RAT includes Long-Term Evolution (LTE) RAT.

14. The apparatus of claim 12, wherein the first RAT includes Long-Term Evolution (LTE) RAT and the second RAT includes New Radio (NR) RAT.

15. The apparatus of claim 12, wherein:
the UE ID is used to identify the UE in the second RAT, and
to determine the context information, the one or more processors are to:
map the UE ID to another UE ID that corresponds to the first RAT and determine the context information based on the another UE ID.

16. The apparatus of claim 12, wherein the RAN node and the another RAN node page the UE to cause the UE to transition from the inactive state to the active state.

17. The apparatus of claim 12, wherein the inactive state includes a mode of operation where the UE does not use a previously established wireless connection but still maintains configuration information for the previously established wireless connection.

18. The apparatus of claim 12, wherein the apparatus stores information indicating a RAT associated with the context information.

19. An apparatus of a User Equipment (UE), the apparatus comprising:
an interface to radio frequency (RF) circuitry; and
one or more processors to:
establish, via the interface to the RF circuitry, a wireless connection with a Radio Access Network (RAN) node corresponding to a first Radio Access Technology (RAT);
receive, via the interface to the RF circuitry, a UE ID assigned to the UE by the RAN node;
transition from an active state to an inactive state;
receive, via the interface to the RF circuitry and from another RAN node, a prompt to transition from the inactive state to the active state, the another RAN node corresponding to a second RAT that is different than the first RAT;

communicate, via the interface to the RF circuitry and to the another RAN node, a request to establish a connection with the another RAN node, the request including the UE ID;

receive, via the interface to the RF circuitry and from the another RAN node, configuration information for establishing the connection with the another RAN node;

establish the connection based on the configuration information; and communicate, via the interface to the RF circuitry, with the another RAN node;

wherein the UE is configured to communicate with multiple RATs;

wherein the apparatus is configured to store context information for each RAT the UE is configured to communicate with.

20. The apparatus of claim 19, wherein the first RAT includes New Radio (NR) RAT and the second RAT includes Long-Term Evolution (LTE) RAT.

21. The apparatus of claim 19, wherein the first RAT includes Long-Term Evolution (LTE) RAT and the second RAT includes New Radio (NR) RAT.

22. The apparatus of claim 19, wherein the UE ID is used to identify the UE in the first RAT and the second RAT.

23. The apparatus of claim 19, wherein the UE ID is only used to identify the UE in the first RAT.

24. The apparatus of claim 19, wherein, prior to entering the inactive state, the one or more processors are further to:
   receive paging area information that includes a first identifier corresponding to the RAN node and a second identifier corresponding to the another RAN node, that the UE may use to roam without incurring any additional signaling.

25. The apparatus of claim 19, wherein the configuration information comprises a difference in data between new connection configuration information and old connection configuration information previously used by the UE;
   wherein the one or more processors are further to:
   calculate the new connection configuration information based on the difference in data;
   establish the connection with the another RAN node based on the new connection configuration information.

* * * * *